(12) United States Patent
Gong et al.

(10) Patent No.: US 12,132,570 B2
(45) Date of Patent: Oct. 29, 2024

(54) SEQUENCE-BASED SIGNAL TRANSMISSION METHOD AND COMMUNICATION APPARATUS

(71) Applicant: Huawei Technologies Co., Ltd., Guangdong (CN)

(72) Inventors: Mingxin Gong, Beijing (CN); Bingyu Qu, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 342 days.

(21) Appl. No.: 17/732,228

(22) Filed: Apr. 28, 2022

(65) Prior Publication Data

US 2022/0255668 A1   Aug. 11, 2022

Related U.S. Application Data

(63) Continuation of application No. PCT/CN2020/124654, filed on Oct. 29, 2020.

(30) Foreign Application Priority Data

Oct. 31, 2019 (CN) .......................... 201911051393.8

(51) Int. Cl.
*H04L 1/1607* (2023.01)
*H04L 27/26* (2006.01)
(Continued)

(52) U.S. Cl.
CPC ........ *H04L 1/1642* (2013.01); *H04L 27/2607* (2013.01); *H04W 72/0446* (2013.01); *H04W 74/0841* (2013.01)

(58) Field of Classification Search
None
See application file for complete search history.

(56) References Cited

U.S. PATENT DOCUMENTS 10,615,899 B1 *  4/2020  Bultan .................... H04J 4/00
2009/0073944 A1   3/2009  Jiang et al.
(Continued)

FOREIGN PATENT DOCUMENTS

CN     101958869 A     1/2011
CN     107431549 A    12/2017
(Continued)

OTHER PUBLICATIONS

R4-155933, Alcatel Lucent, Further Discussion of the New Cyclic Shift Restriction Set for Very High Speed Cells, 3GPP TSG-RAN WG4 Meeting #76bis, Sophia-Antipolis, France, Oct. 12 to 16, 2015, 5 pages.
(Continued)

*Primary Examiner* — Angela Nguyen
(74) *Attorney, Agent, or Firm* — WOMBLE BOND DICKINSON (US) LLP

(57) ABSTRACT

A method includes: determining a first sequence based on a first parameter, a second parameter, and a third parameter, where the first sequence is determined based on the third parameter and a second sequence, the second sequence is determined based on the first parameter and the second parameter, the first parameter and the second parameter are root indexes of the second sequence, and the third parameter is a time domain cyclic shift value; and sending a signal based on the first sequence.

20 Claims, 8 Drawing Sheets

(51) Int. Cl.
    *H04W 72/0446*    (2023.01)
    *H04W 74/0833*    (2024.01)

(56)           References Cited

U.S. PATENT DOCUMENTS

2012/0327975 A1     12/2012   Michaels
2013/0003686 A1*     1/2013   Imamura .............. H04B 1/7083
                                                          370/329
2018/0241603 A1*     8/2018   Jia ....................... H04L 27/2614

FOREIGN PATENT DOCUMENTS

CN         108141295 A     6/2018
CN         108400829 A     8/2018
CN         109392155 A     2/2019
CN         110383703 A    10/2019
EP           3457735 A1    3/2019
KR        20170093371 A    8/2017

OTHER PUBLICATIONS

R1-1711146, Qualcomm Incorporated. PRACH Preamble Design for Capacity Enhancement, 3GPP TSG-RAN WG1 Meeting #89AH, Qingdao, China, Jun. 27-30, 2017, 13 pages.

* cited by examiner

SEQUENCE-BASED SIGNAL TRANSMISSION METHOD AND COMMUNICATION APPARATUS

CROSS-REFERENCE TO RELATED APPLICATIONS

This application is a continuation of International Application No. PCT/CN2020/124654, filed on Oct. 29, 2020, which claims priority to Chinese Patent Application No. 201911051393.8, filed on Oct. 31, 2019. The disclosures of the aforementioned applications are hereby incorporated by reference in their entireties.

TECHNICAL FIELD

This application relates to the communication field, and more specifically, to a sequence-based signal transmission method and a communication apparatus.

BACKGROUND

A random access channel (RACH) is used to carry a RACH signal sent by a terminal device to a network device. The RACH signal includes a RACH sequence and a cyclic prefix (CP). The RACH sequence may be generated by using a Zadoff-Chu sequence (ZC sequence). In a same cell, root indexes of a plurality of ZC sequences corresponding to a plurality of RACH sequences may be different. Alternatively, root indexes of a plurality of ZC sequences corresponding to a plurality of RACH sequences are the same, but the plurality of ZC sequences are obtained by performing different time domain cyclic shifts. In the same cell, when RACH sequences used by different terminal devices to send RACH signals are different, a low cross-correlation between the RACH signals needs to be ensured, so that small interference between different RACH signals sent by different users can be ensured.

As for the ZC sequence, a ZC sequence with a length of N has N−1 different root sequences in total. After a plurality of times of cyclic shift (where lengths of the plurality of times of cyclic shift are different) are performed on a same root sequence, a plurality of different RACH sequences are generated. A cell has a plurality of RACH sequences, and the plurality of RACH sequences are used by a terminal device in the cell. When a quantity of terminal devices in the cell increases, a probability that different terminal devices select a same RACH sequence increases. Consequently, a probability of a RACH signal access collision increases. To reduce a probability of a RACH sequence collision, more RACH sequences are required. Currently, a quantity of ZC sequences is limited. When more terminal devices need to be supported, the quantity of ZC sequences is insufficient. As a result, different terminal devices may use a same RACH sequence, and interference between RACH signals sent by the different terminal devices is large. Consequently, normal access to a channel by the terminal device is affected, normal data transmission performed by the terminal device cannot be ensured, and communication efficiency is reduced.

SUMMARY

This application provides a sequence-based signal transmission method and a communication apparatus, to increase a quantity of different root sequences used to generate a sequence, so that a quantity of sequences used to generate a signal is increased, thereby reducing a probability that different terminal devices use a same first sequence, and resolving a problem of a collision between sequences used by the different terminal devices. In this way, the different terminal devices are prevented, to a great extent, from generating a same signal, so that interference between signals is reduced, efficiency of signal transmission for more users can be ensured, and user experience is improved.

According to a first aspect, a sequence-based signal transmission method is provided. The method may be performed by a terminal device or a chip used in the terminal device. For example, the method is performed by a first terminal device. The method includes:

The first terminal device determines a first sequence based on a first parameter, a second parameter, and a third parameter, where the first sequence is determined based on the third parameter and a second sequence, the second sequence is determined based on the first parameter and the second parameter, the first parameter and the second parameter are root indexes of the second sequence, and the third parameter is a time domain cyclic shift value. The first terminal device sends a signal based on the first sequence.

An element in the second sequence, the first parameter, and the second parameter satisfy the following relationship:

$$x_{u_1,u_2}(n) = \alpha e^{j2\pi\left(\frac{u_1 \times ((n \bmod P) - u_2)^3}{P} + \varphi\right)},$$

where $u_1$ represents the first parameter; $u_2$ represents the second parameter; $x_{u_1,u_2}(n)$ represents an $n^{th}$ element in the second sequence; $\alpha$ is a non-zero complex number; $\varphi$ is a real number; j represents a symbol of an imaginary number in a complex number; n mod P represents performing a modulo operation on n and P, where a value of n ranges from 0 to N−1, and N is a length of the first sequence; $u_1$ is a positive integer less than or equal to P−1; $u_2$ is a natural number less than or equal to P−1; and P is a prime number, where P is a minimum prime number greater than or equal to N, or P is a maximum prime number less than or equal to N, or P is a minimum prime number greater than or equal to 2×N, or P is a maximum prime number less than or equal to 2×N.

According to the sequence-based signal transmission method provided in the first aspect, one root sequence (the second sequence) is determined based on the two root indexes (the first parameter and the second parameter). The first sequence is determined based on the second sequence and the time domain cyclic shift value, and the signal is determined based on the first sequence. Therefore, a quantity of different root sequences may be increased, so that a quantity of different sequences used to generate a signal is increased, a probability that different terminal devices use a same sequence is reduced, and a problem of a collision between sequences used by the different terminal devices is resolved, thereby preventing, to a great extent, the different terminal devices from using a same signal, reducing interference between signals sent by the different terminal devices, and improving communication efficiency. This can ensure efficiency of signal transmission for more users.

In one embodiment, an element in the first sequence, the element in the second sequence, and the third parameter satisfy the following relationship:

$$x_{u_1,u_2,v}(n) = x_{u_1,u_2}(n) \times e^{j2\pi\left(\frac{c_v \times n}{N}\right)},$$

where $x_{u_1,u_2,v}(n)$ represents an $n^{th}$ element in the first sequence; $c_v$ represents the third parameter, and $c_v$ is a real number; $x_{u_1,u_2}(n)$ represents the $n^{th}$ element in the second sequence; and j represents the symbol of the imaginary number in the complex number.

In one embodiment, when the first parameter and the second parameter are respectively the same as a first parameter and a second parameter that are used by a second terminal device, an absolute value of a difference between the third parameter and a third parameter used by the second terminal device is greater than a first threshold, where the first terminal device and the second terminal device are located in a same cell. In this implementation, that both the first terminal device and the second terminal device can correctly send signals to a network device is ensured. This ensures quality and efficiency of sending the signals by the first terminal device and the second terminal device, so that the communication efficiency is improved.

In one embodiment, the first threshold may be determined based on a largest propagation delay in the cell in which the first terminal device and the second terminal device are located.

In one embodiment, when the first parameter is the same as a first parameter used by a third terminal device, an absolute value of a difference between the second parameter used by the first terminal device and a second parameter used by the third terminal device is greater than a second threshold, where the first terminal device and the third terminal device are located in a same cell. In this implementation, that both the first terminal device and the third terminal device can correctly send signals to the network device is ensured. This ensures quality and efficiency of sending the signals by the first terminal device and the third terminal device, so that the communication efficiency is improved.

In one embodiment, the second threshold may be determined based on a largest Doppler frequency shift and a subcarrier spacing.

In one embodiment, the method further includes: The first terminal device receives information about a first parameter group, where the first parameter group includes the first parameter, the second parameter, and the third parameter.

In one embodiment, the method further includes: The first terminal device receives information about a first parameter group set, where the first parameter group set includes a plurality of parameter groups. The first terminal device determines a first parameter group in the first parameter group set, where the first parameter group includes the first parameter, the second parameter, and the third parameter.

In one embodiment, in the first parameter group set, an absolute value of a difference between third parameters in any two parameter groups that have same first parameters and same second parameters is greater than the first threshold. In this implementation, a low correlation between signals generated by different terminal devices and small interference between the signals can be ensured.

In one embodiment, in the first parameter group set, an absolute value of a difference between second parameters in any two parameter groups that have same first parameters is greater than the second threshold. In this implementation, the low correlation between the signals generated by the different terminal devices and the small interference between the signals can be ensured.

In one embodiment, a second parameter group set includes the first parameter group set, where the second parameter group set corresponds to the cell in which the first terminal device is located, and the second parameter group set includes M parameter groups. A candidate parameter group set includes the second parameter group set, where the candidate parameter group set includes a plurality of parameter group subsets, and an $i^{th}$ parameter group subset includes $K_i$ parameter groups, where both i and $K_i$ are positive integers, all first parameters included in one parameter group subset are the same, and first parameters in any two parameter group subsets in the candidate parameter group set are different.

When M is less than or equal to a maximum value of $K_i$, the M parameter groups are any M parameter groups included in any parameter group subset in which a quantity of parameter groups is greater than or equal to M; and/or when M is greater than the maximum value of $K_i$, the M parameter groups include a parameter group subsets and b parameter groups, where both a and b are positive integers, the a parameter group subsets are any a parameter group subsets in the candidate parameter group set, and the b parameter groups are any b parameter groups in any parameter group subset other than the a parameter group subsets in the candidate parameter group set.

In this implementation, a low correlation between sequences generated by different terminal devices in a same cell based on a parameter group and small interference between signals generated by the different terminal devices based on the sequences can be ensured.

In one embodiment, that the first terminal device sends a signal based on the first sequence includes: The first terminal device maps the first sequence to a subcarrier to obtain the signal. The first terminal device sends the signal.

In one embodiment, the signal generated based on the first sequence may be an uplink reference signal such as a RACH signal, a DMRS, an SRS, or a PT-RS.

According to a second aspect, a sequence-based signal transmission method is provided. The method may be performed by a network device or a chip used in the network device. For example, the method is performed by the network device. The method includes: The network device determines a first sequence based on a first parameter, a second parameter, and a third parameter, where the first sequence is determined based on the third parameter and a second sequence, the second sequence is determined based on the first parameter and the second parameter, the first parameter and the second parameter are root indexes of the second sequence, and the third parameter is a time domain cyclic shift value. The network device receives a first signal. The network device determines, based on the first sequence and the first signal, whether the first signal includes a signal generated based on the first sequence.

An element in the second sequence, the first parameter, and the second parameter satisfy the following relationship:

$$x_{u_1,u_2}(n) = \alpha e^{j2\pi\left(\frac{u_1 \times ((n \bmod P) - u_2)^3}{P} + \varphi\right)},$$

where $u_1$ represents the first parameter; $u_2$ represents the second parameter; $x_{u_1,u_2}(n)$ represents an $n^{th}$ element in the second sequence; $\alpha$ is a non-zero complex number; $\varphi$ is a real number; j represents a symbol of an imaginary number in a complex number; n mod P represents performing a modulo operation on n and P, where a value of n ranges from 0 to N−1, and N is a length of the first sequence; $u_1$ is a positive integer less than or equal to P−1; $u_2$ is a natural number less than or equal to P−1; and P is a prime number, where P is a minimum prime number greater than or equal to N, or P is a maximum prime number less than or equal to N, or P is a minimum prime number greater than or equal to 2×N, or P is a maximum prime number less than or equal to 2×N.

According to the sequence-based signal transmission method provided in the second aspect, one root sequence (the second sequence) is determined based on the two parameters (two root indexes), the first sequence is determined based on the root sequence and the time domain cyclic shift value, and the signal (for example, a RACH signal) is generated based on the first sequence. A quantity of different root sequences used to generate a sequence may be increased, so that a quantity of first sequences used to generate a signal is increased, thereby reducing a probability that different terminal devices use a same first sequence, and resolving a problem of a collision between sequences used by the different terminal devices. In this way, the different terminal devices are prevented, to a great extent, from generating a same signal, so that interference between signals is reduced, communication efficiency is improved, and efficiency of signal transmission for more users can be ensured.

In one embodiment, an element in the first sequence, the element in the second sequence, and the third parameter satisfy the following relationship:

$$x_{u_1,u_2,v}(n) = x_{u_1,u_2}(n) \times e^{j2\pi\left(\frac{c_v \times n}{N}\right)},$$

where $x_{u_1,u_2,v}(n)$ represents an $n^{th}$ element in the first sequence; $c_v$ represents the third parameter, and $c_v$ is a real number; $x_{u_1,u_2}(n)$ represents the $n^{th}$ element in the second sequence; and j represents the symbol of the imaginary number in the complex number.

In one embodiment, the method further includes: The network device separately sends information about a parameter group to a first terminal device and a second terminal device, where when the first parameter and the second parameter included in the parameter group sent to the first terminal device are respectively the same as a first parameter and a second parameter included in the parameter group sent to the second terminal device, an absolute value of a difference between the third parameter included in the parameter group sent to the first terminal device and a third parameter included in the parameter group sent to the second terminal device is greater than a first threshold, where the first terminal device and the second terminal device are located in a same cell.

In one embodiment, the method further includes: The network device separately sends information about a parameter group to the first terminal device and a third terminal device, where when the first parameter included in the parameter group sent to the first terminal device is the same as a first parameter included in the parameter group sent to the third terminal device, an absolute value of a difference between the second parameter included in the parameter group sent to the first terminal device and a second parameter included in the parameter group sent to the third terminal device is greater than a second threshold, where the first terminal device and the third terminal device are located in a same cell.

In one embodiment, the method further includes:

The network device sends information about a first parameter group set to the first terminal device, where the first parameter group set includes a first parameter group, and the first parameter group includes the first parameter, the second parameter, and the third parameter.

In one embodiment, in the first parameter group set, an absolute value of a difference between third parameters in any two parameter groups that have same first parameters and same second parameters is greater than the first threshold.

In one embodiment, in the first parameter group set, an absolute value of a difference between second parameters in any two parameter groups that have same first parameters is greater than the second threshold.

In one embodiment, a second parameter group set includes the first parameter group set, where the second parameter group set corresponds to the cell in which the first terminal device is located, and the second parameter group set includes M parameter groups. A candidate parameter group set includes the second parameter group set, where the candidate parameter group set includes a plurality of parameter group subsets, and an $i^{th}$ parameter group subset includes $K_i$ parameter groups, where both i and $K_i$ are positive integers, all first parameters included in one parameter group subset are the same, and first parameters in any two parameter group subsets in the candidate parameter group set are different.

When M is less than or equal to a maximum value of $K_i$, the M parameter groups are any M parameter groups included in any parameter group subset in which a quantity of parameter groups is greater than or equal to M; and/or when M is greater than the maximum value of $K_i$, the M parameter groups include a parameter group subsets and b parameter groups, where both a and b are positive integers, the a parameter group subsets are any a parameter group subsets in the candidate parameter group set, and the b parameter groups are any b parameter groups in any parameter group subset other than the a parameter group subsets in the candidate parameter group set.

In one embodiment, that the network device determines, based on the first sequence and the first signal, whether the first signal includes a signal generated based on the first sequence includes:

The network device obtains a sequence carried on a subcarrier of the first signal; correlates the carried sequence with the first sequence; and determines whether the first signal includes the signal generated based on the first sequence.

In one embodiment, the signal generated based on the first sequence may be an uplink reference signal such as a RACH signal, a DMRS, an SRS, or a PT-RS.

According to a third aspect, a communication apparatus is provided. The apparatus includes units configured to perform the operations in any one of the first aspect or the possible implementations of the first aspect.

According to a fourth aspect, a communication apparatus is provided. The apparatus includes units configured to perform the operations in any one of the second aspect or the possible implementations of the second aspect.

According to a fifth aspect, a communication apparatus is provided. The apparatus includes at least one processor and a memory, and the at least one processor is configured to perform the method according to any one of the first aspect or the possible implementations of the first aspect.

According to a sixth aspect, a communication apparatus is provided. The apparatus includes at least one processor and a memory, and the at least one processor is configured to perform the method according to any one of the second aspect or the possible implementations of the second aspect.

According to a seventh aspect, a communication apparatus is provided. The apparatus includes at least one processor and an interface circuit, and the at least one processor is configured to perform the method according to any one of the first aspect or the possible implementations of the first aspect.

According to an eighth aspect, a communication apparatus is provided. The apparatus includes at least one processor and an interface circuit, and the at least one processor is configured to perform the method according to any one of the second aspect or the possible implementations of the second aspect.

According to a ninth aspect, a terminal device is provided. The terminal device includes the communication apparatus provided in the third aspect, or the terminal device includes the communication apparatus provided in the fifth aspect, or the terminal device includes the communication apparatus provided in the seventh aspect.

According to a tenth aspect, a network device is provided. The network device includes the communication apparatus provided in the fourth aspect, or the terminal device includes the communication apparatus provided in the sixth aspect, or the terminal device includes the communication apparatus provided in the eighth aspect.

According to an eleventh aspect, a computer program product is provided. The computer program product includes a computer program. When the computer program is executed by a processor, the computer program is configured to perform the method according to any one of the first aspect or the possible implementations of the first aspect, or perform the method according to any one of the second aspect or the possible implementations of the second aspect.

According to a twelfth aspect, a computer-readable storage medium is provided. The computer-readable storage medium stores a computer program. When the computer program is executed, the computer program is configured to perform the method according to any one of the first aspect or the possible implementations of the first aspect, or perform the method according to any one of the second aspect or the possible implementations of the second aspect.

According to a thirteenth aspect, a communication system is provided. The communication system includes the foregoing terminal device and the foregoing network device.

According to a fourteenth aspect, a chip is provided. The chip includes a processor, configured to invoke a computer program from a memory and run the computer program, so that a communication device in which the chip is installed performs the method according to any one of the first aspect or the possible implementations of the first aspect, or performs the method according to any one of the second aspect or the possible implementations of the second aspect.

According to the sequence-based signal transmission method provided in embodiments of this application, one root sequence (the second sequence) is determined based on the two parameters (two root indexes), the first sequence is determined based on the root sequence and the time domain cyclic shift value, and the signal (for example, the RACH signal) is generated based on the first sequence. The quantity of different root sequences used to generate the sequence may be increased, so that the quantity of first sequences used to generate the signal is increased, thereby reducing the probability that different terminal devices use a same first sequence, and resolving the problem of a collision between sequences used by the different terminal devices. In this way, the different terminal devices are prevented, to a great extent, from generating the same signal, so that the interference between signals is reduced, the communication efficiency is improved, and the efficiency of signal transmission for more users can be ensured.

DESCRIPTION OF EMBODIMENTS

Figure 1:
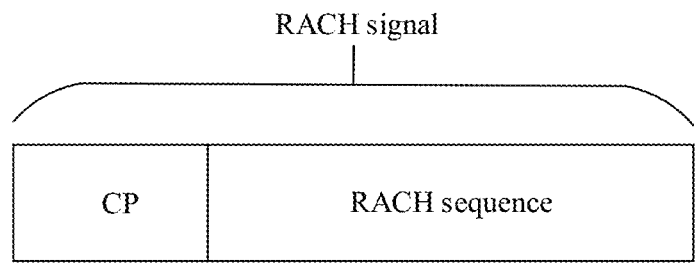
FIG. 1 is a schematic diagram of a structure of a RACH signal.

The following describes technical solutions of this application with reference to the accompanying drawings.

The technical solutions of embodiments of this application may be applied to various communication systems, for example, a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, and a future 5th generation (5G) system or new radio (NR) system.

A terminal device in embodiments of this application may be referred to as user equipment, an access terminal, a subscriber unit, a subscriber station, a mobile station, a mobile console, a remote station, a remote terminal, a mobile device, a user terminal, a terminal, a wireless communication device, a user agent, a user apparatus, or the like. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in embodiments of this application.

A network device in embodiments of this application may be a device configured to communicate with a terminal device. The network device may be a base transceiver station (BTS) in a global system for mobile communications (GSM) system or code division multiple access (CDMA), or may be a NodeB (NB) in a wideband code division multiple access (WCDMA) system, or may be an evolved NodeB (Evolutional NodeB, eNB or eNodeB) in an LTE system, or may be a radio controller in a cloud radio access network (CRAN) scenario. Alternatively, the network device may be a relay station, an access point, a vehicle-mounted device, a wearable device, a network device in a future 5G network, a network device in a future evolved PLMN network, or the like. This is not limited in embodiments of this application.

A RACH is an uplink channel in a wireless communication system, and is used to carry a RACH signal sent by a terminal device to a network device. An uplink sending timing of the RACH signal is determined based on a downlink channel timing received by the terminal device. Distances between different terminal devices and the network device (for example, a base station) are different. Therefore, when there is no uplink sending timing advance (A), time points at which the RACH signal reaches the network device are different. A longer distance from the network device indicates a later time point at which the RACH signal reaches the network device. When the network device detects the RACH signal, the network device may learn that the terminal device sends the RACH signal, and may further obtain delay information of the RACH signal sent by the terminal device. When a plurality of terminal devices simultaneously send different RACH signals, the network device may detect a plurality of RACH signals, to complete a random access process for the plurality of terminal devices. Different codewords may be used for the plurality of RACH signals.

In an NR system, as shown in FIG. 1, a RACH signal includes a RACH sequence and a CP. The CP is set to overcome a problem that different terminal devices send RACH signals at different time points. The RACH sequence may be generated based on a Zadoff-Chu sequence (ZC sequence), for example, a ZC sequence whose length is 139 or a ZC sequence whose length is 839. In a same cell, root indexes of ZC sequences corresponding to different RACH sequences may be different. Alternatively, root indexes of ZC sequences corresponding to different RACH sequences are the same, but the ZC sequences are obtained by performing different time domain cyclic shifts. To be specific, when the RACH sequences used by the different terminal devices to send the RACH signals are different, a low cross-correlation between the RACH signals needs to be ensured, so that small interference between the different RACH signals sent by different users can be ensured. The root index is used to identify a root sequence (root sequence). For example, if two sequences correspond to different root indexes, the two sequences correspond to different root sequences.

As for the ZC sequence, a ZC sequence with a length of N has N−1 different root sequences in total, and the different root sequences correspond to different root indexes (Root indexes) or root indexes. After a plurality of times of cyclic shift (where lengths of the plurality of times of cyclic shift are different) are performed on a same root sequence, a plurality of different RACH sequences are generated. A cell has a plurality of RACH sequences, and the plurality of RACH sequences are used by a terminal device in the cell. When a quantity of terminal devices in the cell increases, a probability that different terminal devices select a same RACH sequence increases. Consequently, a probability of a RACH signal access collision increases. More RACH sequences are required to reduce the probability of the collision. Alternatively, the different RACH sequences may be allocated to the different terminal devices in advance. When a plurality of terminal devices need to be supported, more RACH sequences are required. Alternatively, during RACH access, when different RACH signals need to be used to carry more information, more RACH sequences are required.

Currently, a quantity of ZC sequences is limited. When more terminal devices need to be supported, the quantity of ZC sequences is insufficient. As a result, different terminal devices may use a same RACH sequence, and interference between different RACH signals sent by the different terminal devices is large. Consequently, normal access to a channel by the terminal device is affected, normal data transmission performed by the terminal device cannot be ensured, and communication efficiency is reduced.

In view of this, this application provides a sequence-based signal transmission method, where one root sequence (a second sequence) is determined based on the two parameters (two root indexes), a first sequence is determined based on the root sequence and a time domain cyclic shift value, and a signal (for example, a RACH signal) is generated based on the first sequence. A quantity of different root sequences used to generate a sequence may be increased, so that a quantity of first sequences used to generate the signal is increased, thereby reducing a probability that different terminal devices use a same first sequence, and resolving a problem of a collision between sequences used by the different terminal devices. In this way, the different terminal devices are prevented, to a great extent, from generating a same signal, so that interference between signals is reduced, communication efficiency is improved, and efficiency of signal transmission for more users can be ensured.

For ease of understanding embodiments of this application, a communication system to which embodiments of this application are applicable is first briefly described with reference to FIG. 2.

Figure 2:
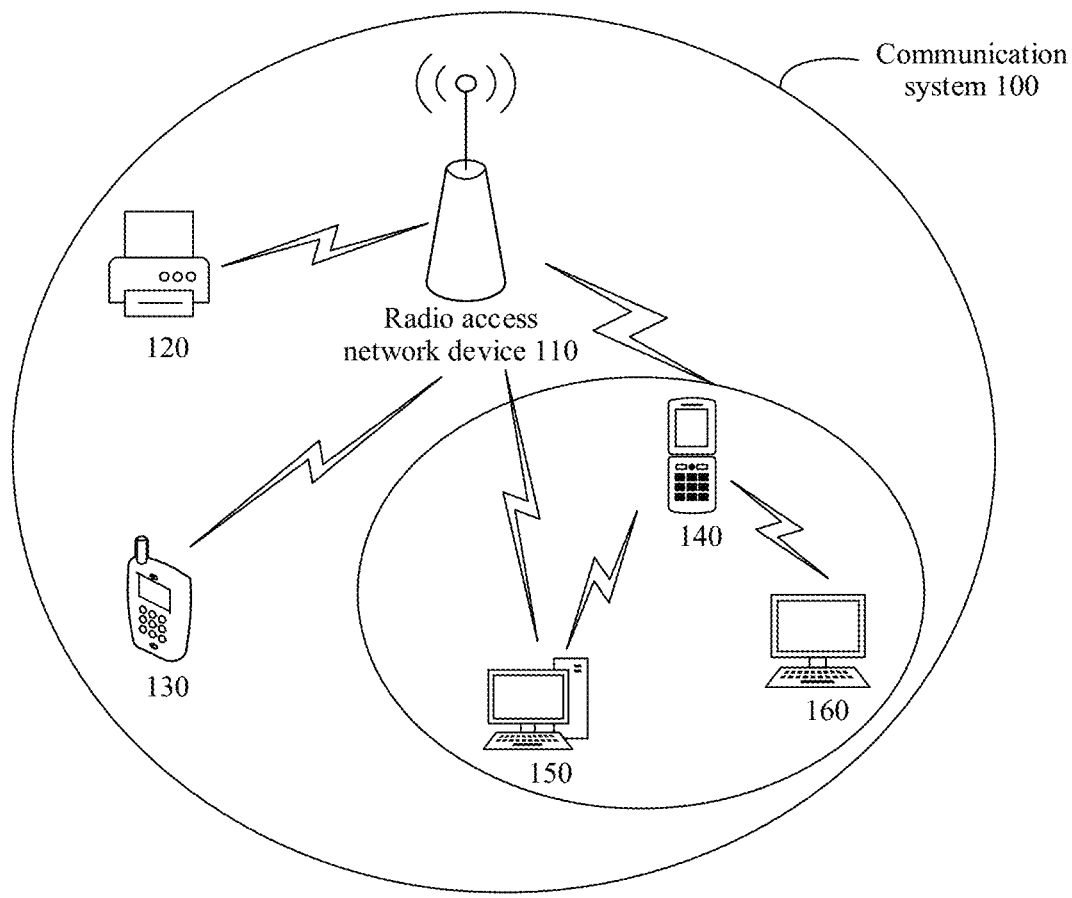
FIG. 2 is a schematic diagram of an architecture of a mobile communication system to which an embodiment of this application is applicable.

FIG. 2 is a schematic diagram of a communication system to which an embodiment of this application is applicable. As shown in FIG. 2, the mobile communication system 100 may include at least one radio access network device 110 and at least one terminal device (terminal devices 120, 130, 140, 150, and 160 shown in FIG. 2). The terminal device is connected to the radio access network device in a wireless manner, and the radio access network device may be the foregoing network device. The at least one terminal device may send uplink data or information to the radio access network device, or the radio access network device 110 may send downlink data or information to the at least one terminal device. When the at least one terminal device sends an uplink reference signal such as a RACH signal, a demodulation reference signal (DMRS), or a sounding reference signal (SRS) to the radio access network device 110, the sequence-based signal transmission method provided in this application may be used. In addition, a communication system may alternatively include a plurality of terminal devices. For example, a communication system may include the terminal devices 140, 150, and 160, and the terminal device 140 may also send downlink data or information to the terminal devices 150 and 160.

It should be understood that FIG. 2 is only a schematic diagram, and the communication system may further include another network device and/or another terminal device that are/is not shown in FIG. 2. Quantities of radio access network devices and terminals included in the mobile communication system are not limited in embodiments of this application. In the mobile communication system 100, the radio access network device 110 may be the foregoing network device. This is not limited in this embodiment of this application.

Figure 3:
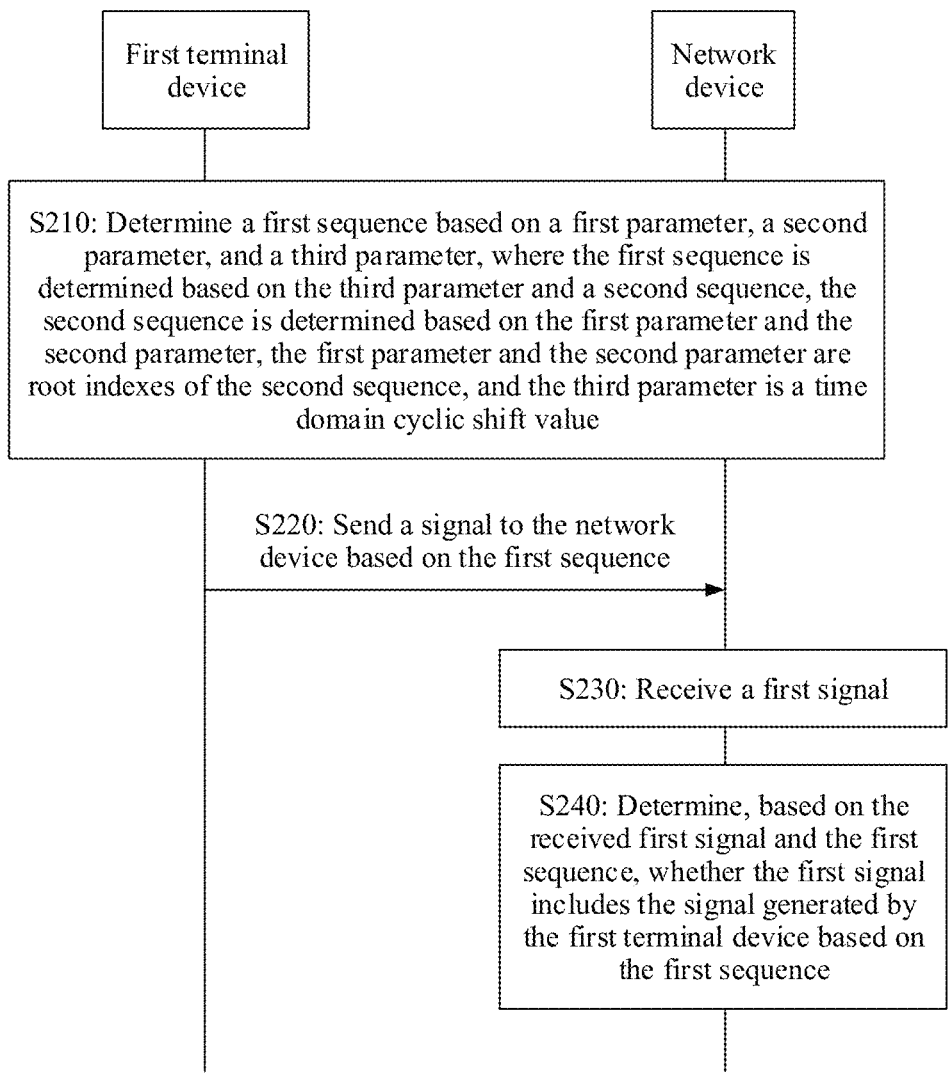
FIG. 3 is a schematic interaction diagram of a sequence-based signal transmission method according to an embodiment of this application.

The following describes in detail a sequence-based signal transmission method provided in this application with reference to FIG. 3. FIG. 3 is a schematic flowchart of a signal transmission method 200 according to an embodiment of this application. The method 200 may be applied to a scenario shown in FIG. 2, and certainly may also be applied to another scenario. This is not limited in embodiments of this application.

It should be understood that, in the following descriptions, an example in which the method in the embodiments is performed by a terminal device and a network device is used to describe the method in the embodiments. By way of example but not limitation, the method may alternatively be performed by a chip used in the terminal device and a chip used in the network device.

As shown in FIG. 3, the method 200 shown in FIG. 3 may include operation S210 to operation S240. The following describes in detail the operations in the method 200 with reference to FIG. 3. The method 200 includes the following operations.

S210: A first terminal device and the network device determine a first sequence based on a first parameter, a second parameter, and a third parameter. The first sequence is determined based on the third parameter and a second sequence, the second sequence is determined based on the first parameter and the second parameter, the first parameter and the second parameter are root indexes of the second sequence, and the third parameter is a time domain cyclic shift value.

S220: The first terminal device sends a signal to the network device based on the first sequence.

S230: The network device receives a first signal.

S240: The network device determines, based on the received first signal and the first sequence, whether the first signal includes the signal generated by the first terminal device based on the first sequence.

An element in the second sequence, the first parameter, and the second parameter satisfy the following relation (1):

$$x_{u_1,u_2}(n) = \alpha e^{j2\pi\left(\frac{u_1 \times ((n\bmod P) - u_2)^3}{P} + \varphi\right)} \quad (1)$$

In the relation (1), $u_1$ represents the first parameter; $u_2$ represents the second parameter; $x_{u_1,u_2}(n)$ represents an $n^{th}$ element in the second sequence; $\alpha$ is a non-zero complex number; $\varphi$ is a real number; $j$ represents a symbol of an imaginary number in a complex number; $n \bmod P$ represents performing a modulo operation on n and P, where a value of n ranges from 0 to N−1, and N is a length of the first sequence; $u_1$ is a positive integer less than or equal to P−1; $u_2$ is a natural number less than or equal to P−1; or P is a minimum prime number greater than or equal to N, or P is a maximum prime number less than or equal to N, or P is a minimum prime number greater than or equal to 2×N, or P is a maximum prime number less than or equal to 2×N.

In S210, both the first terminal device and the network device may determine the first sequence based on the first parameter, the second parameter, and the third parameter. It should be understood that although S210 is represented as a block in FIG. 3, the first terminal device and the network device separately perform S210, and there is no association relationship in a time sequence. In addition, there is no association relationship in a time sequence among performing S210 by the network device, performing S220 by the terminal device, and performing S230 by the network device. The first sequence may be a sequence used to generate an uplink reference signal. The first sequence is determined based on the third parameter and the second sequence, where the second sequence may be considered as a root sequence of the first sequence. The second sequence is determined based on the first parameter and the second parameter, where the first parameter and the second parameter are root indexes (Root indexes) of the second sequence, or the first parameter and the second parameter may be referred to as sequence numbers of the second sequence. That is, one root sequence has two sequence numbers, and the sequence numbers of the root sequence are jointly determined based on the first parameter and the second parameter.

After determining the second sequence, both the first terminal device and the network device may determine, based on the second sequence and the third parameter, the first sequence used to generate the signal. The third parameter may be the time domain cyclic shift value, to be specific, the first sequence is obtained by performing cyclic shift on the second sequence based on the third parameter as the time domain cyclic shift value.

The $n^{th}$ element in the second sequence $x_{u_1,u_2}(n)$, the first parameter $u_1$, and the second parameter $u_2$ satisfy the foregoing relation (1).

In the relation (1), the value of n may be an integer less than the length N of the first sequence. For example, a value of N may be 139 or 839. The value of n may be 0, 1, 2, 3, . . . , N−1. P is a prime number, and $u_1$ is the positive integer less than or equal to P−1, for example, $u_1 \in \{1, 2, 3 \ldots P−1\}$. $u_2$ is the natural number less than or equal to P−1, for example, $u_2 \in \{0, 1, 2, 3 \ldots P−1\}$.

When N is a prime number, a value of P may be equal to N. Alternatively, P is the minimum prime number greater than N, or P is the maximum prime number less than N, or P is the minimum prime number greater than 2×N, or P is the maximum prime number less than 2×N. $\alpha$ is the non-zero complex number, and $\varphi$ is the real number. Each element included in the second sequence may be determined according to the foregoing relation (1), that is, the root sequence may be determined.

It should be understood that for two second sequences (or may also be referred to as two root sequences), the two second sequences are the same only when values of $u_1$ corresponding to the two second sequences respectively are the same, and values of $u_2$ corresponding to the two second sequences respectively are the same. In other words, the second sequence is jointly determined based on $u_1$ and $u_2$. The two sequences are different provided that one of $u_1$ and $u_2$ that are of the two sequences is different.

After the second sequence (the root sequence) is determined, the first sequence may be determined based on the second sequence and the time domain cyclic shift value. For example, for a second sequence, a plurality of different first sequences may be determined based on different time domain cyclic shift values. In other words, the first sequence is jointly determined based on three parameters including $u_1$, $u_2$, and the time domain cyclic shift value. Two first sequences are the same only when $u_1$, $u_2$, and a time domain cyclic shift value of one first sequence are respectively the same as $u_1$, $u_2$, and a time domain cyclic shift value of the other first sequence. In this application, $u_1$ and $u_2$ may alternatively be considered as root indexes of the first sequence. A quantity of root sequences corresponding to the first sequence whose length is N is far greater than N−1.

For example, the first sequence may be a RACH sequence, the second sequence may be a root sequence of the RACH sequence, $u_1$ and $u_2$ may be sequence numbers of the first sequence, and the time domain cyclic shift value may be a time domain cyclic shift value corresponding to the RACH sequence. In this case, a condition that two RACH sequences are the same is: $u_1$, $u_2$, and a time domain cyclic shift value corresponding to one RACH sequence are respectively the same as $u_1$, $u_2$, and a time domain cyclic shift value corresponding to the other RACH sequence. The two RACH sequences are different provided that one of the three parameters $u_1$, $u_2$, and the time domain cyclic shift value is different.

In S220, the first terminal device sends the signal to the network device based on the first sequence.

Specifically, the first terminal device may generate the signal based on the first sequence. For example, the first terminal device may map the first sequence to N subcarriers to generate the signal, that is, the signal may be carried on the N subcarriers, and the signal is sent to the network device by using the N subcarriers. In one embodiment, the first terminal device may further add a cyclic prefix to the obtained signal, and send, to the network device, a signal to which the cyclic prefix is added.

In one embodiment, in this embodiment of this application, the signal generated based on the first sequence may be the uplink reference signal such as a RACH signal, a DMRS, an SRS, or a phase tracking reference signal (PT-RS). A specific form of the signal generated based on the first sequence is not limited in this application.

In S230, the network device receives the first signal. The first signal received by the network device may include signals respectively sent by a plurality of terminal devices to the network device. The signals sent by the different terminal devices to the network device may be generated based on different root sequences, or may be generated based on a same root sequence but different time domain cyclic shift values. The first signal may include the signal generated by the first terminal device based on the first sequence (for brevity, the signal generated by the first terminal device based on the first sequence is referred to as a second signal below), or may not include a second signal. For example, the first signal may include RACH signals respectively sent by the plurality of terminal devices to the network device.

Therefore, in S240, the network device may determine, based on the received first signal and the first sequence determined in S210, whether the first signal includes the signal (the second signal) generated by the first terminal device based on the first sequence. Specifically, the network device may obtain a sequence carried on N subcarriers of the first signal, correlate a frequency domain sequence carried on the N subcarriers with the first sequence, and determine whether the first signal includes the signal generated based on the first sequence. For example, if a correlation value is greater than or equal to a preset or predefined threshold, that the first signal includes the second signal is determined. If the correlation value is less than the preset or predefined threshold, that the first signal does not include the second signal is determined.

In one embodiment, in a possible implementation, a specific implementation of performing correlation processing on the first sequence and the frequency domain sequence to obtain the correlation value may be: The network device determines, based on the first sequence and possible cyclic shift caused during transmission, a sequence obtained by performing possible cyclic shift (caused during transmission) on the first sequence; and correlates the sequence with the time domain sequence to obtain a group of correlation values. A specific implementation of determining, based on the correlation value, whether the first signal includes the signal sent based on the first sequence may be: The network device performs normalization processing (for example, noise normalization processing) on the group of correlation values to obtain a group of normalized correlation values. If a largest value in the group of normalized correlation values is greater than the preset threshold, the network device determines that the first signal includes the signal sent based on the first sequence. In an implementation, if the largest value in the group of normalized correlation values is less than or equal to the preset threshold, the network device determines that the first signal does not include the signal sent based on the first sequence.

When the method provided in this application is applied to a random access process, that the network device determines that the first signal includes the signal sent based on the first sequence may indicate that the network device receives a random access request sent by a terminal device. Further, the network device may determine a distance between the terminal device that sends the random access request and the network device based on possible cyclic shift that is caused during transmission and that corresponds to the largest value in the foregoing group of correlation values. Further, the network device may determine a TA value based on the distance, and send the TA value to the terminal device (that sends the random access request). In a possible implementation, the network device may determine, based on a preset correspondence between a cyclic shift value and a distance, the distance between the terminal device that sends the random access request and the network device. In a possible implementation, in the correspondence, a smaller cyclic shift value corresponds to a shorter distance.

According to the sequence-based signal transmission method provided in this application, one root sequence (the second sequence) is determined based on the two root indexes (the first parameter and the second parameter). The first sequence is determined based on the second sequence and the time domain cyclic shift value, and the signal is determined based on the first sequence. Therefore, a quantity of different root sequences may be increased, so that a quantity of different sequences used to generate a signal is increased, a probability that different terminal devices use a same sequence is reduced, and a problem of a collision between sequences used by the different terminal devices is resolved, thereby preventing, to a great extent, the different terminal devices from using a same signal, reducing interference between signals sent by the different terminal devices, and improving communication efficiency. This can ensure efficiency of signal transmission for more users.

It should be understood that, in this embodiment of this application, in addition to the foregoing relation (1), another relation may be used to represent the relation that the $n^{th}$ element in the second sequence $x_{u_1,u_2}(n)$, the first parameter $u_1$, and the second parameter $u_2$ satisfy. This is not limited in this embodiment of this application.

In one embodiment, in some possible implementations of this application, an $n^{th}$ element in the first sequence, the $n^{th}$ element in the second sequence, and the third parameter may satisfy the following relation (2):

$$x_{u_1,u_2,v}(n) = x_{u_1,u_2}(n) \times e^{j2\pi\left(\frac{c_v \times n}{N}\right)}. \quad (2)$$

In the relation (2), the value of n may be the integer less than the length N of the first sequence, and $x_{u_1,u_2,v}(n)$ represents the $n^{th}$ element in the first sequence. $c_v$ represents the third parameter, namely, the time domain cyclic shift value, where $c_v$ is a real number. $x_{u_1,u_2}(n)$ represents the $n^{th}$ element in the second sequence, and j represents the symbol of the imaginary number in the complex number. A subscript v in $c_v$ represents an index number of the third parameter. In one embodiment, $v \in \{0, 1, 2, 3 \ldots \}$. For example, $c_1$ and $c_2$ represent two different time domain cyclic shift values. Each element included in the first sequence may be determined based on the foregoing relation (2), the element in the root sequence (the second sequence), and the time domain cyclic shift value, that is, the first sequence is determined.

In this embodiment of this application, $u_1$ and $u_2$ may alternatively be understood as the root indexes or root indexes of the first sequence.

It should be understood that, in this embodiment of this application, in addition to the foregoing relation (2), another relation may be used to represent the relation that the $n^{th}$ element $x_{u_1,u_2,v}(n)$ in the first sequence and the $n^{th}$ element $x_{u_1,u_2}(n)$ in the second sequence satisfy. This is not limited in this embodiment of this application.

Figure 4:
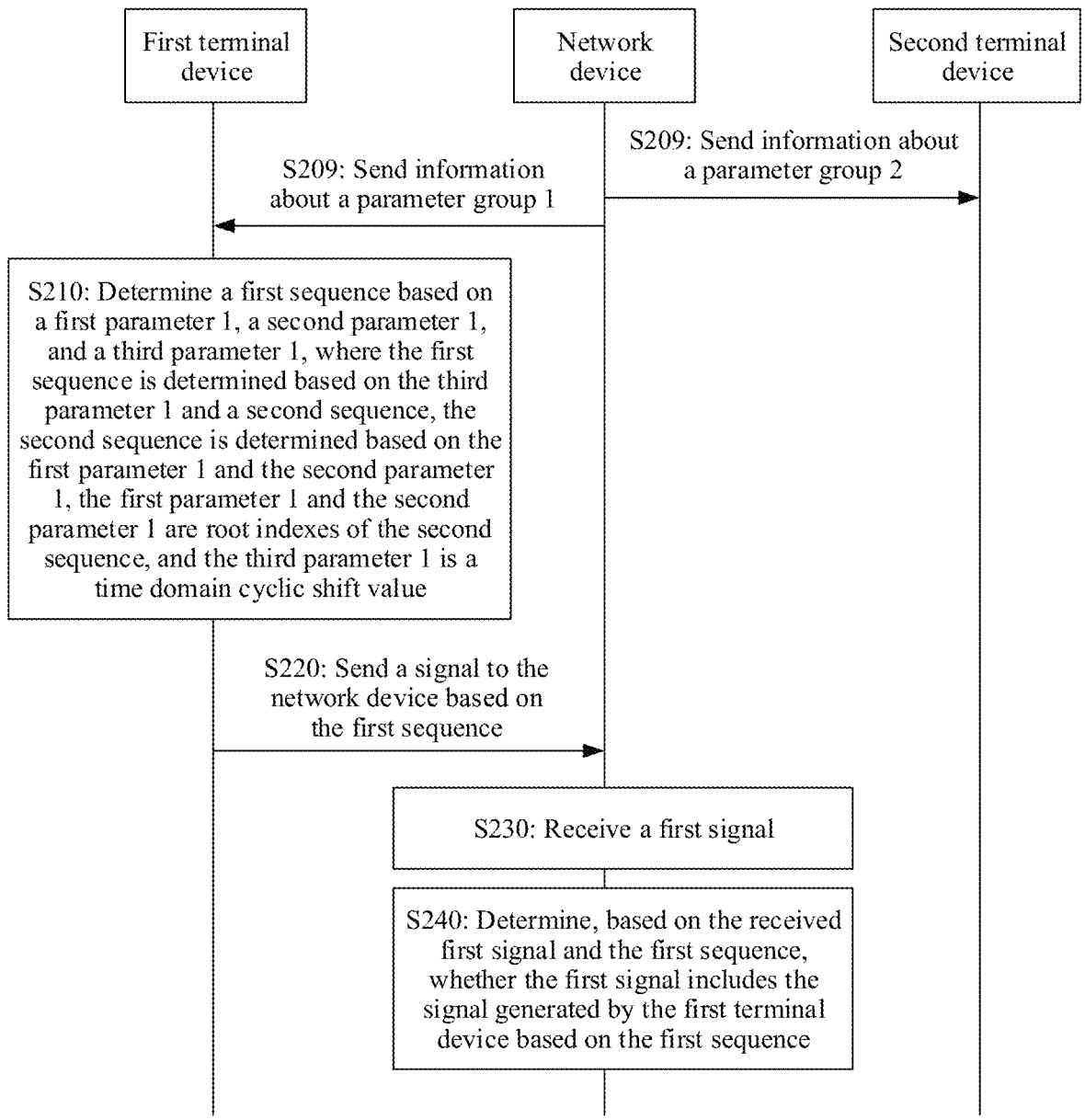
FIG. 4 is a schematic interaction diagram of another sequence-based signal transmission method according to an embodiment of this application.

In one embodiment, in some possible implementations of this application, FIG. 4 is a schematic flowchart of a sequence-based signal transmission method according to some embodiments of this application. Based on the method operations shown in FIG. 3, the method may further include S209.

S209: The network device separately sends information about a parameter group to the first terminal device and a second terminal device. When the first parameter (referred to as a first parameter 1) and the second parameter (referred to as a second parameter 1) included in the information about the parameter group (referred to as a parameter group 1) sent to the first terminal device are respectively the same as a first parameter (referred to as a first parameter 2) and a second parameter (referred to as a second parameter 2) included in the information about the parameter group (referred to as a parameter group 2) sent to the second terminal device, an absolute value of a difference between the third parameter (referred to as a third parameter 1) included in the parameter group 1 sent to the first terminal device and a third parameter (referred to as a third parameter 2) included in the parameter group 2 sent to the second terminal device is greater than a first threshold, where the first terminal device and the second terminal device are located in a same cell. Correspondingly, the first terminal device and the second terminal device respectively receive the corresponding parameter groups.

For operations S210 to S240 shown in FIG. 4, refer to the foregoing related descriptions of S210 to S240. For brevity, details are not described herein again.

In S209, the network device may separately send the information about the parameter group to the first terminal device and the second terminal device. For brevity, the information about the parameter group sent by the network device to the first terminal device is referred to as information about the parameter group 1 (or may also be referred to as a first parameter group), and the information about the parameter group sent to the second terminal device is referred to as information about the parameter group 2, where the first terminal device and the second terminal device are located in the same cell. The parameter group 1 includes the first parameter, the second parameter, and the third parameter in S210. The parameter group 2 also includes a first parameter, a second parameter, and a third parameter, where the third parameter is a time domain cyclic shift value. For differentiation, the first parameter, the second parameter, and the third parameter that are used by the first terminal device in S210 are referred to as the first parameter 1 (which may alternatively be represented as $u_1^1$, where a subscript 1 represents the first parameter, and a superscript 1 represents the first terminal device), the second parameter 1 (which may alternatively be represented as $u_2^1$, where a subscript 2 represents the second parameter, and the superscript 1 represents the first terminal device), and the third parameter 1. The first parameter, the second parameter, and the third parameter that are included in the parameter group 2 are respectively referred to as the first parameter 2 (which may alternatively be represented as $u_1^2$, where a subscript 1 represents the first parameter, and a superscript 2 represents the second terminal device), the second parameter 2 (which may alternatively be represented as $u_2^2$, where a subscript 2 represents the second parameter, and the superscript 2 represents the second terminal device), and the third parameter 2.

In one embodiment, the second terminal device may also determine a first sequence by using the first parameter 2, the second parameter 2, and the third parameter 2. The first sequence is determined based on the third parameter 2 and a second sequence, the second sequence is determined based on the first parameter 2 and the second parameter 2, the first parameter 2 and the second parameter 2 are root indexes of the second sequence, and the third parameter 2 is a time domain cyclic shift value. An element in the second sequence, the first parameter 2, and the second parameter 2 may also satisfy the foregoing relation (1). An element in the first sequence, the element in the second sequence, and the third parameter 2 may also satisfy the foregoing relation (2). The second terminal device generates a signal (referred to as a signal 2 for differentiation) based on the first sequence, and sends the signal 2 to the network device.

In some possible implementations, when a value of the first parameter 1 is the same as a value of the first parameter 2, and a value of the second parameter 1 is the same as the value of the second parameter 2, that is, when $u_1^1=u_1^2$ and $u_2^1=u_2^2$, the root sequence (the second sequence) used by the first terminal device to generate the signal is the same as a root sequence used by the second terminal device to generate the signal. Because the first terminal device and the second terminal device are located in the same cell, to prevent the first terminal device and the second terminal device from generating the signals by using a same sequence, that the third parameter 1 (a time domain cyclic shift value 1) is different from the third parameter 2 (a time domain cyclic shift value 2) needs to be ensured. In addition, because a distance between the first terminal device and the network device may be different from a distance between the second terminal device and the network device, propagation delays required for the signals sent, to the network device, by the first terminal device and the second terminal device to reach the network device are different. When a difference between the time domain cyclic shift values (the third parameter 1 and the third parameter 2) used by the first terminal device and the second terminal device is small, due to a propagation delay difference, the signals transmitted by the two terminal devices may be the same when reaching the network device. Consequently, the network device cannot distinguish between the signals transmitted by the first terminal device and the second terminal device. Therefore, it can be ensured, only when an absolute value of a difference between the third parameter 1 and the third parameter 2 is greater than or equal to the first threshold, that a network side device can distinguish between the signal (referred to as the signal 1) generated by the first terminal device based on the first parameter 1, the second parameter 1, and the third parameter 1 and the signal (referred to as the signal 2) generated by the second terminal device based on the first parameter 2, the second parameter 2, and the third parameter 2, that is, interference between the signal 1 and the signal 2 is small. This ensures that both the first terminal device and the second terminal device can correctly send the signals to the network device and ensures quality and efficiency of sending the signals by the first terminal device and the second terminal device, so that the communication efficiency is improved.

In one embodiment, in this embodiment of this application, the first threshold may be L, where L may be determined based on a largest propagation delay of the cell in which the first terminal device and the second terminal device are located, that is, may be determined based on a radius of the cell, because the largest propagation delay of the cell is related to the radius of the cell. When there is timing advance information, L is determined by a largest multipath delay.

Figure 5:
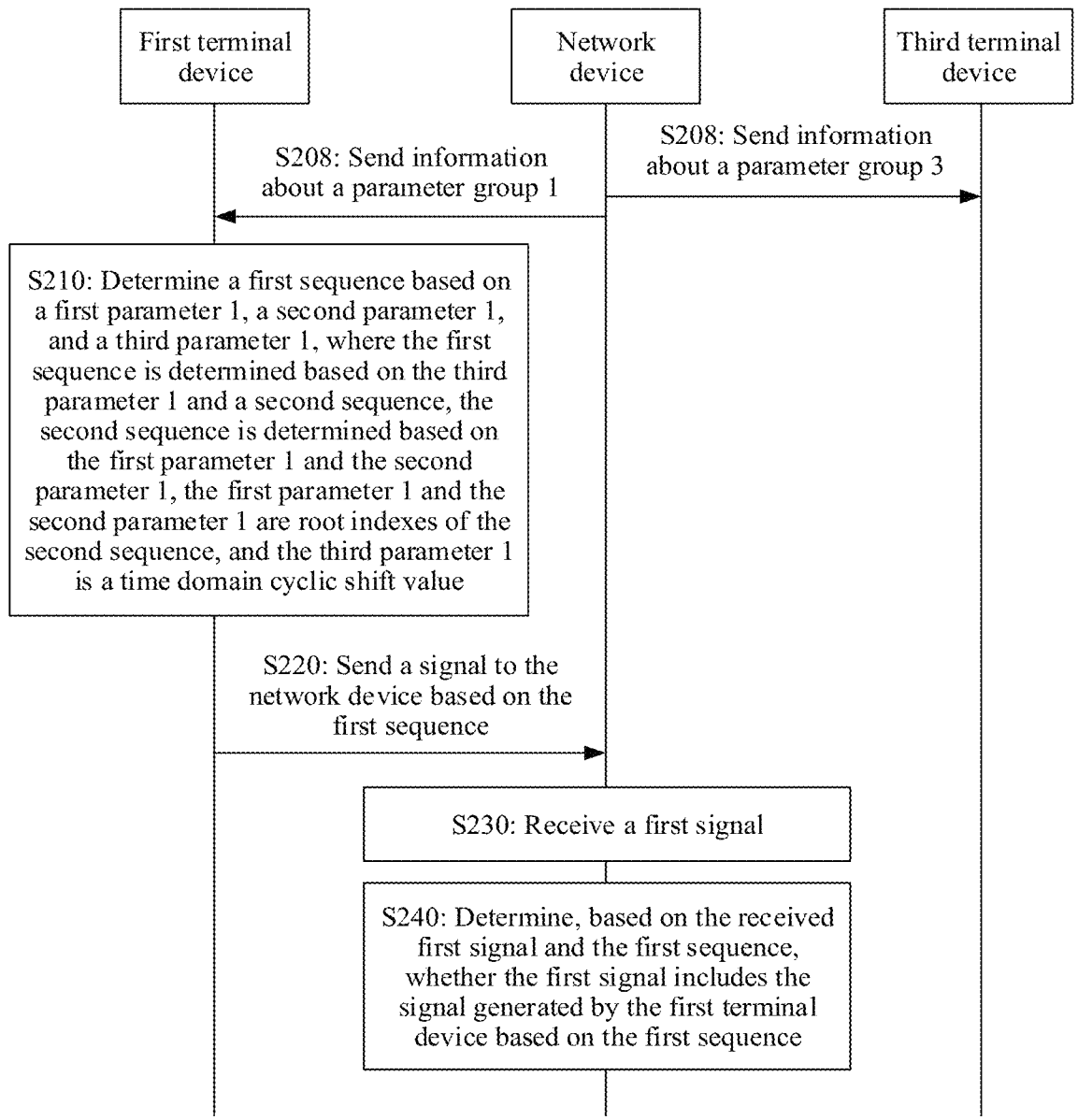
FIG. 5 is a schematic interaction diagram of another sequence-based signal transmission method according to an embodiment of this application.

In one embodiment, in some possible implementations of this application, FIG. 5 is a schematic flowchart of a sequence-based signal transmission method according to some embodiments of this application. Based on the method operations shown in FIG. 3, the method may further include S208.

S208: The network device separately sends information about a parameter group to the first terminal device and a third terminal device, where when the first parameter (referred to as a first parameter 1) included in the information about the parameter group (referred to as a parameter group 1) sent to the first terminal device is the same as a first parameter (referred to as a first parameter 3) included in the information about the parameter group (referred to as a parameter group 3) sent to the third terminal device, an absolute value of a difference between the second parameter (referred to as a second parameter 1) included in the parameter group 1 sent to the first terminal device and a second parameter (referred to as a second parameter 3) included in the parameter group 3 sent to the third terminal device is greater than a second threshold, where the first terminal device and the third terminal device are located in a same cell. Correspondingly, the first terminal device and the third terminal device respectively receive the corresponding parameter groups.

For operations S210 to S240 shown in FIG. 5, refer to the foregoing related descriptions of S210 to S240. For brevity, details are not described herein again.

In S208, the network device may alternatively separately send the information about the parameter group to the first terminal device and the third terminal device. For brevity, the information about the parameter group sent by the network device to the first terminal device is referred to as information about the parameter group 1 (or may also be referred to as a first parameter group), and the information about the parameter group sent to the third terminal device is referred to as information about the parameter group 3, where the first terminal device and the third terminal device are located in the same cell. The parameter group 1 includes the first parameter, the second parameter, and the third parameter in S210. The parameter group 3 also includes a first parameter, a second parameter, and a third parameter. The first parameter, the second parameter, and the third parameter that are included in the parameter group 3 are respectively referred to as the first parameter 3 (which may alternatively be represented as $u_1^3$, where a subscript 1 represents the first parameter, and a superscript 3 represents the third terminal device), the second parameter 3 (which may alternatively be represented as $u_2^3$, where a subscript 2 represents the second parameter, and the superscript 3 represents the third terminal device), and a third parameter 3.

In one embodiment, the third terminal device may also determine a first sequence by using the first parameter 3, the second parameter 3, and the third parameter 3. The first sequence is determined based on the third parameter 3 and a second sequence, the second sequence is determined based on the first parameter 3 and the second parameter 3, the first parameter 3 and the second parameter 3 are root indexes of the second sequence, and the third parameter 3 is a time domain cyclic shift value. An element in the second sequence, the first parameter 3, and the second parameter 3 may also satisfy the foregoing relation (1). An element in the first sequence, the element in the second sequence, and the third parameter 3 may also satisfy the foregoing relation (2). The third terminal device generates a signal (referred to as a signal 3 for differentiation) based on the first sequence, and sends the signal 3 to the network device.

When the first parameter 1 included in the parameter group 1 is the same as the first parameter 3 included in the parameter group 3, and the second parameter 1 is different from the second parameter 3, that is, $u_1^1=u_1^2$ and $u_2^1 \ne u_2^3$, because small interference between the signal 1 and the signal 3 needs to be ensured, an absolute value of a difference between the second parameter 1 and the second parameter 3 needs to be greater than or equal to the second threshold, where the second threshold may be represented as $d_o$, that is, $|u_2^1-u_2^3| \ge d_o$, before it can be ensured that a correlation between the signal 1 generated by the first terminal device based on the first parameter 1, the second parameter 1, and the third parameter 1 and the signal 3 generated by the third terminal device based on the first parameter 3, the second parameter 3, and the third parameter 3 is small, that is, the interference between the signal 1 and the signal 3 is small. This ensures that both the first terminal device and the third terminal device can correctly send the signals to the network device and ensures quality and efficiency of sending the signals by the first terminal device and the third terminal device, so that the communication efficiency is improved.

In one embodiment, when $u_1^1=u_1^2$ and $|u_2^1-u_2^3| \ge d_o$, the third parameter 1 and the third parameter 3 may be the same or may be different.

It should be understood that, in this embodiment of this application, the parameter group 1, the parameter group 2, and the parameter group 3 may be configured by the network device for the first terminal device, the second terminal device, and the third terminal device respectively by using signaling, or may be predefined in a protocol. The third terminal device and the second terminal device may be a same terminal device, or may be different terminal devices.

In one embodiment, in this embodiment of this application, the second threshold $d_o$ may be determined based on a largest Doppler frequency shift d and a subcarrier spacing $\Delta f$, for example, $d_o=2\lceil d/\Delta f \rceil$, $d_o=\lceil 2*d/\Delta f \rceil$, or the like. The subcarrier spacing $\Delta f$ may be a subcarrier spacing $\Delta f$ corresponding to the cell in which the first terminal device and the third terminal device are located. In this embodiment of this application, a value of $d_o$ is not limited.

In this embodiment of this application, In one embodiment, the signal 1, the signal 2, and the signal 3 each may be the RACH signal, the DMRS, the SRS, the PT-RS, or the like. Specific forms of the signal 1 and the signal 2 are not limited in this embodiment of this application.

It should be understood that the first threshold and/or the second threshold may be predefined, or may be configured by the network device by using the signaling.

In embodiments of this application, being predefined may be understood as being defined in the protocol. Being configured by using the signaling may be understood as being configured by using higher layer signaling or physical layer signaling. The higher layer signaling may include, for example, radio resource control (RRC) signaling, medium access control (MAC) control element (CE), and radio link control (RLC) signaling. The physical layer signaling may include, for example, downlink control information (DCI).

In one embodiment, in some possible implementations of this application, the network device may alternatively send information about a parameter group set (namely, a first parameter group set) to the first terminal device rather than directly send the information about the parameter group 1 to the first terminal device. The first parameter group set includes a plurality of parameter groups, where each parameter group includes a first parameter, a second parameter, and a third parameter. The first parameter group set includes a first parameter group (namely, the parameter group 1). In one embodiment, the first parameter group set may be a set including a parameter group specific to the cell in which the first terminal device is located, or the first parameter group set may be a set including a parameter group dedicated to several terminal devices or one terminal device (for example, the first terminal device) in a cell. After receiving the first parameter group set, the first terminal device may determine or select the first parameter group or the parameter group 1 from the first parameter group set. In this way, the first parameter, the second parameter, and the third parameter in S210 are determined. For example, the first parameter group set may include the parameter group 1, the parameter group 2, and the parameter group 3.

It should be understood that the first parameter group set includes one or more parameter groups. When the first parameter group set includes the plurality of parameter groups, each of the plurality of parameter groups includes a first parameter, a second parameter, and a third parameter. A condition for two parameter groups being the same is that first parameters included in the two parameter groups are the same, second parameters included in the two parameter groups are the same, and third parameters included in the two parameter groups are also the same. In the plurality of parameter groups, first parameters included in different parameter groups may be the same or may be different. Similarly, second parameters included in different parameter groups may be the same or may be different, and third parameters included in different parameter groups may be the same or may be different.

In one embodiment, the second terminal device and/or the third terminal device may also receive the first parameter group set, and respectively determine or select the parameter group 2 and/or the parameter group 3 from the parameter groups included in the first parameter group set. Any two of the parameter group 1, the parameter group 2, and the parameter group 3 are different. For example, that the parameter group 1 is different from the parameter group 2 may be understood as that at least one of the three parameters included in the parameter group 1 is different from at least one of the three corresponding parameters included in the parameter group 2.

In one embodiment, in some possible implementations of this application, because the first parameter group set may be the set including the parameter group specific to the cell in which the first terminal device is located, or the first parameter group set may be the set including the parameter group specific to the several terminal devices (for example, including the first terminal device, the second terminal device, and the third terminal device), a low correlation between signals generated by different terminal devices and small interference between the signals need to be ensured when the different terminal devices select different parameter groups from the first parameter group set and when the signals are generated by using the methods in S210 and S220 based on parameters included in the selected parameter groups. Therefore, in the parameter groups included in the first parameter group set, an absolute value of a difference between third parameters in any two parameter groups that have same first parameters and same second parameters is greater than or equal to the first threshold. For example, the first threshold may be L. For the first threshold, refer to the foregoing descriptions of the first threshold. For brevity, details are not described herein again.

In one embodiment, in the parameter groups included in the first parameter group set, an absolute value of a difference between second parameters in any two parameter groups that have same first parameters is greater than the second threshold. For example, the second threshold may be $d_o$. Third parameters included in the any two parameter groups that have the same first parameters may be the same or may be different. For the second threshold, refer to the foregoing descriptions of the second threshold. For brevity, details are not described herein again.

According to the sequence-based signal transmission method provided in this application, a first parameter group set is configured for a terminal device, and in the first parameter group set, a difference between third parameters or a difference between second parameters in different parameter groups satisfy a preset threshold. This ensures small interference between signals generated by different terminal devices based on determined parameter groups, and ensures that all the different terminal devices can correctly send signals to the network device, so that the communication efficiency is improved.

In one embodiment, in some possible implementations of this application, a second parameter group set includes the first parameter group set, and the second parameter group set corresponds to the cell in which the first terminal device is located. In other words, the second parameter group set is a set including all parameter groups available in the cell in which the first terminal device is located. For example, the second parameter group set may be a union set of the parameter groups available to all terminal devices in the cell in which the first terminal device is located. The second parameter group set may be the same as the first parameter group set, or the first parameter group set may be a subset of the second parameter group set.

The second parameter group set includes M parameter groups, and a candidate parameter group set includes the second parameter group set. The candidate parameter group set may be understood as a set including all parameter groups available to all cells. For example, the candidate parameter group set is a union set of the parameter groups available to terminal devices in all the cells, and the second parameter group set may be a subset of the candidate parameter group set. A quantity of parameter groups included in the second parameter group set is less than or equal to a quantity of parameter groups included in the candidate parameter group set.

The candidate parameter group set includes a plurality of parameter group subsets, first parameters in a plurality of parameter groups included in one parameter group subset are the same, and first parameters in any two parameter group subsets in the candidate parameter group set are different. In one embodiment, second parameters in the plurality of parameter groups included in the parameter group subset may be the same or may be different. Third parameters in the plurality of parameter groups included in the parameter group subset may be the same or may be different. Second parameters in any two parameter group subsets in the candidate parameter group set may be the same or may be different. Third parameters in any two parameter group subsets in the candidate parameter group set may be the same or may be different. An $i^{th}$ parameter group subset includes $K_i$ parameter groups, where both i and $K_i$ are positive integers.

For example, the candidate parameter group set includes 20 parameter groups. It is assumed that the 20 parameter groups are divided into four parameter group subsets, namely, a parameter group subset 1, a parameter group subset 2, a parameter group subset 3, and a parameter group subset 4. Values of first parameters in parameter groups included in the parameter group subset 1 are the same, where it is assumed that the values of the first parameters are 1. Values of first parameters in parameter groups included in the parameter group subset 2 are the same, where it is assumed that the values of the first parameters are 2. Values of first parameters in parameter groups included in the parameter group subset 3 are the same, where it is assumed that the values of the first parameters are 3. Values of first parameters in parameter groups included in the parameter group subset 4 are the same, where it is assumed that the values of the first parameters are 4. Quantities of parameter groups included in the parameter group subsets 1 to 4 may be the same or may be different. For example, the parameter group subsets 1 to 4 each may include five parameter groups, or the parameter group subset 1 includes c parameter groups, the parameter group subset 2 includes d parameter groups, the parameter group subset 3 includes e parameter groups, and the parameter group subset 4 includes 20-c-d-e parameter groups, where c, d, and e are all positive integers, and at least two of c, d, e, and 20-c-d-e are different.

$K_i$ is a quantity of parameter groups included in the $i^{th}$ parameter group subset. For example, in the foregoing example, a value of i is 1, 2, 3, or 4. When the quantities of parameter groups included in the parameter group subsets are the same, $K_1=K_2=K_3=K_4=5$. When the quantities of parameter groups included in the parameter group subsets are different, $K_1=c$, $K_2=d$, $K_3=e$, and $K_4=20-c-d-e$.

M is the quantity of parameter groups included in the second parameter group set.

When M is less than or equal to a maximum value of $K_i$, the M parameter groups are any M parameter groups included in any parameter group subset in which a quantity of parameter groups is greater than or equal to M. That is, values of first parameters in the parameter groups included in the second parameter group set are the same.

For example, assuming that M is equal to 4 and $K_1=K_2=K_3=K_4=5$, four parameter groups included in the second parameter group set are four parameter groups included in any one of the parameter group subsets 1 to 4. For another example, assuming that $K_1=c=3$, $K_2=4$, $K_3=6$, and $K_4=20-c-d-e=7$, the parameter groups included in the second parameter group set are four parameter groups included in any one of the parameter group subsets 2 to 4. In other words, the values of the first parameters in the parameter groups included in the second parameter group set are the same.

When M is greater than the maximum value of $K_i$, the M parameter groups include a parameter group subsets and b parameter groups, where both a and b are positive integers, the a parameter group subsets are any a parameter group subsets in the candidate parameter group set, and the b parameter groups are any b parameter groups in any parameter group subset other than the a parameter group subsets in the candidate parameter group set. That is, the values of the first parameters in the parameter groups included in the second parameter group set are not the same.

For example, assuming that M is equal to 11 and $K_1=K_2=K_3=K_4=5$, 11 parameter groups included in the second parameter group set are any two of the parameter group subsets 1 to 4 and another parameter group. In this case, a is equal to 2. The two parameter group subsets may be any two of the parameter group subsets 1 to 4, and it is assumed that the two parameter group subsets are the parameter group subset 1 and the parameter group subset 2. In this case, the another parameter group is any parameter group included in the parameter group subset 3 or the parameter group subset 4. The values of the first parameters in the second parameter group set include 1, 2, and 3 or 4.

For another example, assuming that $K_1=c=3$, $K_2=4$, $K_3=6$, and $K_4=20-c-d-e=7$, the 11 parameter groups included in the second parameter group set may be nine parameter groups included in the parameter group subsets 1 and 3, where a is equal to 2, and b is equal to 2. The other two parameter groups may be any two parameter groups included in the parameter group subset 2 or the parameter group subset 4. The values of the first parameters in the second parameter group set include 1, 3, and 2 or 4.

For another example, assuming that $K_1=c=3$, $K_2=4$, $K_3=6$, and $K_4=20-c-d-e=7$, the 11 parameter groups included in the second parameter group set may be six parameter groups included in the parameter group subset 3, where a is equal to 1, and b is equal to 5. The other five parameter groups may be any five parameter groups included in the parameter group subset 4. The values of the first parameters in the second parameter group set include 3 and 4.

In this embodiment of this application, it needs to be ensured as much as possible that the first parameters included in the second parameter group set are the same. That is, the second parameter group set includes only one parameter group subset, or the second parameter group set is a subset of a subset in the candidate parameter group set. Parameter groups that have same first parameters are allocated to a same cell as much as possible, so that a low correlation between sequences generated by different terminal devices in the same cell based on the parameter groups and small interference between signals generated by the different terminal devices based on the sequence can be ensured.

If the quantity of parameter groups included in the second parameter group set is greater than a maximum quantity of parameter groups included in the candidate parameter group subset, it needs to be ensured as much as possible that a quantity of different values of the first parameters included in the second parameter group set is minimum. In other words, the second parameter group set includes a minimum quantity of parameter group subsets. Alternatively, the sequences generated by the different terminal devices in the same cell based on the parameter group may have a low correlation. This ensures the small interference between the signals generated by the different terminal devices based on the sequences.

In one embodiment, in a possible implementation of this application, one logical index may be configured for a cell corresponding to the network device, the logical index corresponds to one or more parameter groups, and a first parameter and a second parameter in each of a plurality of parameter groups corresponding to the logical index are the same. Different logical indexes correspond to different parameter groups, or at least one of a first parameter and a second parameter in each parameter group corresponding to different logical indexes is different. That is, one logical index corresponds to one second sequence, and configuring a logical index for a cell may be understood as configuring an available second sequence for the cell. The network device may determine the second sequence based on a first parameter and a second parameter that correspond to the logical index. If a quantity of determined second sequences is less than a quantity of second sequences required by the cell, the network device updates the logical index, and continues to determine a second sequence based on a first parameter and a second parameter in a parameter group corresponding to an updated logical index, until the quantity of determined second sequences meets a requirement of the second sequence required by the cell. In an implementation, when the logical index is i, the updated logical index may be i+1.

A correspondence between a logical index and a first parameter and a second parameter in a parameter group that is shown in Table 1 is used as an example. It is assumed that the candidate parameter group set may be divided into four parameter group subsets, namely, a parameter group subset 1, a parameter group subset 2, a parameter group subset 3, and a parameter group subset 4. Details are shown in Table 1. Values of first parameters in parameter groups included in the parameter group subset 1 are all 1. Values of first parameters in parameter groups included in the parameter group subset 2 are all 2. Values of first parameters in parameter groups included in the parameter group subset 3 are all 3. Values of first parameters in parameter groups included in the parameter group subset 4 are all 4. It should be noted that each logical index in Table 1 may correspond to one or more parameter groups, and a quantity of parameter groups corresponding to the logical index depends on a quantity of different RACH sequences that can be obtained from one root sequence based on a time domain cyclic shift (a third parameter). In addition, logical indexes included in one parameter group subset are consecutive.

TABLE 1

| Parameter group subset number | Logical index i | Value of the first parameter | Value of the second parameter |
|---|---|---|---|
| 1 | 0 | 1 | 0 |
|  | 1 | 1 | 1 |
|  | 2 | 1 | 2 |
|  | 3 | 1 | 3 |
|  | 4 | 1 | 4 |
| 2 | 5 | 2 | 0 |
|  | 6 | 2 | 1 |
|  | 7 | 2 | 2 |
|  | 8 | 2 | 3 |
|  | 9 | 2 | 4 |
| 3 | 10 | 3 | 0 |

TABLE 1-continued

| Parameter group subset number | Logical index i | Value of the first parameter | Value of the second parameter |
|---|---|---|---|
|  | 11 | 3 | 1 |
|  | 12 | 3 | 2 |
|  | 13 | 3 | 3 |
|  | 14 | 3 | 4 |
| 4 | 15 | 4 | 0 |
|  | 16 | 4 | 1 |
|  | 17 | 4 | 2 |
|  | 18 | 4 | 3 |
|  | 19 | 4 | 4 |

It should be understood that Table 1 is merely an example, and should not impose any limitation on the value of the first parameter, the value of the second parameter, a value of the third parameter, the candidate parameter group subset, and the like in embodiments of this application.

It should be further understood that Table 1 is merely an example. In embodiments of this application, it only needs to be ensured that logical indexes corresponding to parameter groups having same values of first parameters are consecutive. In Table 1, the logical indexes in the parameter groups having the same values of the first parameters may be interchanged. The parameter groups having the same first parameters belong to one group. The logical indexes in each group may be interchanged, or the logical indexes in each group may also be interchanged in a unit of a group. For example, the correspondence between the logical index i and the first parameter and the correspondence between the logical index i and the second parameter may alternatively be shown in Table 2.

TABLE 2

| Parameter group subset number | Logical index i | Value of the first parameter | Value of the second parameter |
|---|---|---|---|
| 1 | 0 | 2 | 0 |
|  | 1 | 2 | 1 |
|  | 2 | 2 | 2 |
|  | 3 | 2 | 3 |
|  | 4 | 2 | 4 |
| 2 | 5 | 1 | 0 |
|  | 6 | 1 | 1 |
|  | 7 | 1 | 2 |
|  | 8 | 1 | 3 |
|  | 9 | 1 | 4 |
| 3 | 10 | 3 | 0 |
|  | 11 | 3 | 1 |
|  | 12 | 3 | 2 |
|  | 13 | 3 | 3 |
|  | 14 | 3 | 4 |
| 4 | 15 | 4 | 0 |
|  | 16 | 4 | 1 |
|  | 17 | 4 | 2 |
|  | 18 | 4 | 3 |
|  | 19 | 4 | 4 |

According to the sequence-based signal transmission method provided in this application, one root sequence is determined based on two root indexes or two parameters, a first sequence is determined based on the root sequence and a time domain cyclic shift value, and a signal is determined based on the first sequence. Therefore, a quantity of different root sequences may be increased, so that a quantity of different sequences used to generate the signal is increased, a probability that different terminal devices use a same sequence is reduced, and a problem of a collision between sequences used by the different terminal devices is resolved, thereby preventing, to a great extent, the different terminal devices from using a same signal, and reducing interference between signals sent by the different terminal devices. This can ensure efficiency of signal transmission for more users.

It should be understood that division of manners, cases, types, and embodiments in embodiments of this application are merely for ease of description, but should not constitute any special limitation, and features in various manners, types, cases, and embodiments may be combined when there is no contradiction.

It should be further understood that various numerical symbols related to embodiments of this application are differentiated merely for ease of description, but are not used to limit the scope of embodiments of this application. Sequence numbers of the foregoing processes do not indicate an execution sequence. The execution sequence of the processes should be determined based on functions and internal logic of the processes, and should not be construed as any limitation on the implementation processes of embodiments of this application.

It should be further understood that the foregoing descriptions are only intended to help a person skilled in the art better understand embodiments of this application, instead of limiting the scope of embodiments of this application. It is clear that a person skilled in the art may make various equivalent modifications or changes based on the foregoing examples. For example, some operations in the foregoing method 200 may be unnecessary, or some operations may be newly added. Alternatively, any two or more of the foregoing embodiments are combined. Such modifications, changes, or combined solutions also fall within the scope of embodiments of this application.

It should be further understood that the foregoing descriptions of embodiments of this application focus on differences between the embodiments. For same or similar parts that are not mentioned, refer to these embodiments. For brevity, details are not described herein again.

It should be further understood that in embodiments of this application, "predefinition" may be implemented by pre-storing corresponding code or a corresponding table in a device (for example, a terminal device or a network device) or in another manner that can be used to indicate related information. A specific implementation of "predefinition" is not limited in this application.

The foregoing describes in detail the sequence-based signal transmission method in embodiments of this application with reference to FIG. 1 to FIG. 5. The following describes in detail communication apparatuses in embodiments of this application with reference to FIG. 6 to FIG. 12.

Figure 6:
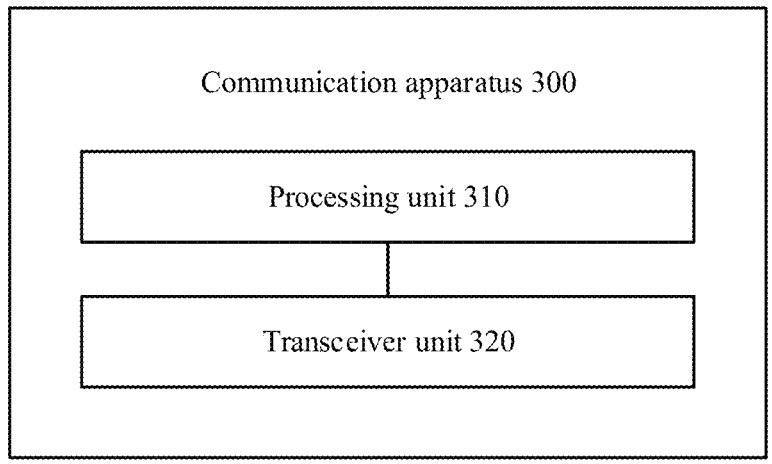
FIG. 6 is a schematic block diagram of a communication apparatus according to an embodiment of this application.

FIG. 6 is a schematic block diagram of a communication apparatus 300 according to an embodiment of this application. The apparatus 300 may correspond to the first terminal device described in the method 200, or may be a chip or a component used in the first terminal device. In addition, modules or units in the apparatus 300 are separately configured to perform the actions or processing processes performed by the first terminal device in the method 200.

As shown in FIG. 6, the apparatus 300 may include a processing unit 310 and a transceiver unit 320. The transceiver unit 320 is configured to send or receive a specific signal under driving of the processing unit 310.

The processing unit 310 is configured to determine a first sequence based on a first parameter, a second parameter, and a third parameter, where the first sequence is determined based on the third parameter and a second sequence, the second sequence is determined based on the first parameter and the second parameter, the first parameter and the second parameter are root indexes of the second sequence, and the third parameter is a time domain cyclic shift value.

The transceiver unit 320 is configured to send a signal based on the first sequence.

An element in the second sequence, the first parameter, and the second parameter satisfy the following relationship:

$$x_{u_1,u_2}(n) = \alpha e^{j2\pi\left(\frac{u_1 \times ((n \bmod P) - u_2)^3}{P} + \varphi\right)},$$

where $u_1$ represents the first parameter; $u_2$ represents the second parameter; $x_{u_1,u_2}(n)$ represents an $n^{th}$ element in the second sequence; $\alpha$ is a non-zero complex number; $\varphi$ is a real number; j represents a symbol of an imaginary number in a complex number; n mod P represents performing a modulo operation on n and P, where a value of n ranges from 0 to N−1, and N is a length of the first sequence; $u_1$ is a positive integer less than or equal to P−1; $u_2$ is a natural number less than or equal to P−1; and P is a prime number, where P is a minimum prime number greater than or equal to N, or P is a maximum prime number less than or equal to N, or P is a minimum prime number greater than or equal to 2×N, or P is a maximum prime number less than or equal to 2×N.

According to the communication apparatus provided in this application, one root sequence (the second sequence) is determined based on the two root indexes (the first parameter and the second parameter), the first sequence is determined based on the second sequence and the time domain cyclic shift value, and the signal is determined based on the first sequence. Therefore, a quantity of different root sequences may be increased, so that a quantity of different sequences used to generate the signal is increased, a probability that different apparatuses use a same sequence is reduced, and a problem of a collision between sequences used by the different terminal devices is resolved, thereby preventing, to a great extent, the different terminal devices from using a same signal, reducing interference between signals sent by the different terminal devices, and improving communication efficiency. This can ensure efficiency of signal transmission for more users.

In one embodiment, in some embodiments of this application, an element in the first sequence, the element in the second sequence, and the third parameter satisfy the following relationship:

$$x_{u_1,u_2,v}(n) = x_{u_1,u_2}(n) \times e^{j2\pi\left(\frac{c_v \times n}{N}\right)},$$

where $x_{u_1,u_2,v}(n)$ represents an $n^{th}$ element in the first sequence; $c_v$ represents the third parameter, and $c_v$ is a real number; $x_{u_1,u_2}(n)$ represents the $n^{th}$ element in the second sequence; and j represents the symbol of the imaginary number in the complex number.

In one embodiment, in some embodiments of this application, when the first parameter and the second parameter are respectively the same as a first parameter and a second parameter that are used by a second terminal device, an absolute value of a difference between the third parameter and a third parameter used by the second terminal device is greater than a first threshold, where the apparatus and the second terminal device are located in a same cell.

In one embodiment, in some embodiments of this application, when the first parameter is the same as a first parameter used by a third terminal device, an absolute value of a difference between the second parameter used by the first terminal device and a second parameter used by the third terminal device is greater than a second threshold, where the apparatus and the third terminal device are located in a same cell.

In one embodiment, in some embodiments of this application, the transceiver unit 320 is further configured to receive information about a first parameter group, where the first parameter group includes the first parameter, the second parameter, and the third parameter.

In one embodiment, in some embodiments of this application, the transceiver unit 320 is further configured to receive information about a first parameter group set, where the first parameter group set includes a plurality of parameter groups.

The processing unit 310 is further configured to determine a first parameter group in the first parameter group set, where the first parameter group includes the first parameter, the second parameter, and the third parameter.

In one embodiment, in some embodiments of this application, in the first parameter group set, an absolute value of a difference between third parameters in any two parameter groups that have same first parameters and same second parameters is greater than the first threshold.

In one embodiment, in some embodiments of this application, in the first parameter group set, an absolute value of a difference between second parameters in any two parameter groups that have same first parameters is greater than the second threshold.

In one embodiment, in some embodiments of this application, a second parameter group set includes the first parameter group set, where the second parameter group set corresponds to the cell in which the first terminal device is located, and the second parameter group set includes M parameter groups. A candidate parameter group set includes the second parameter group set, where the candidate parameter group set includes a plurality of parameter group subsets, and an $i^{th}$ parameter group subset includes $K_i$ parameter groups, where both i and $K_i$ are positive integers, all first parameters included in one parameter group subset are the same, and first parameters in any two parameter group subsets in the candidate parameter group set are different.

When M is less than or equal to a maximum value of $K_i$, the M parameter groups are any M parameter groups included in any parameter group subset in which a quantity of parameter groups is greater than or equal to M; and/or when M is greater than the maximum value of $K_i$, the M parameter groups include a parameter group subsets and b parameter groups, where both a and b are positive integers, the a parameter group subsets are any a parameter group subsets in the candidate parameter group set, and the b parameter groups are any b parameter groups in any parameter group subset other than the a parameter group subsets in the candidate parameter group set.

In one embodiment, in some embodiments of this application, the processing unit 310 is further configured to map the first sequence to a subcarrier to obtain the signal.

The transceiver unit 320 is further configured to send the signal.

Further, the apparatus 300 may further include a storage unit, and the transceiver unit 320 may be a transceiver, an input/output interface, or an interface circuit. The storage unit is configured to store instructions executed by the transceiver unit 320 and the processing unit 310. The transceiver unit 320, the processing unit 310, and the storage unit are coupled to each other. The storage unit stores the instructions. The processing unit 310 is configured to execute the instructions stored in the storage unit. The transceiver unit 320 is configured to send or receive the specific signal under driving of the processing unit 310.

It should be understood that for a specific process in which the units in the apparatus 300 perform the foregoing corresponding operations, refer to the foregoing descriptions related to the first terminal device with reference to the related embodiments in the method 200 and FIG. 3 to FIG. 5. For brevity, details are not described herein again.

In one embodiment, the transceiver unit 320 may include a receiving unit (module) and a sending unit (module), configured to perform the operations of sending information and receiving information that are performed by the first terminal device in the embodiments of the foregoing method 200 and the embodiments shown in FIG. 3 to FIG. 5.

Figure 7:
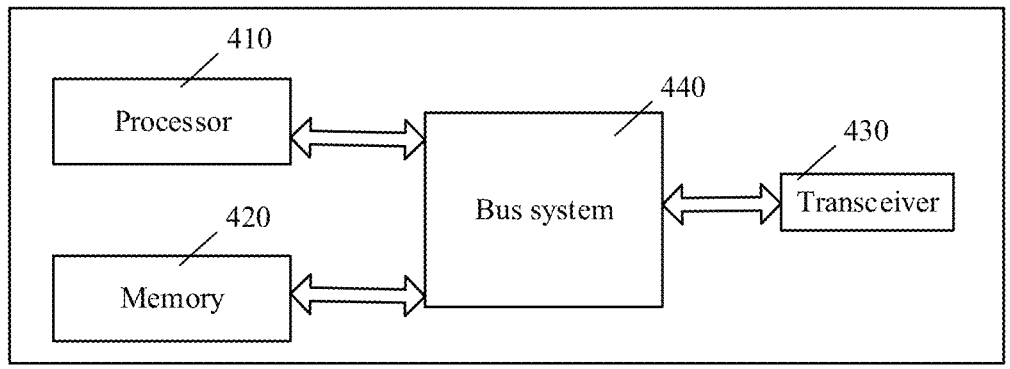
FIG. 7 is a schematic block diagram of another communication apparatus according to an embodiment of this application.

It should be understood that the transceiver unit 320 may be the transceiver, the input/output interface, or the interface circuit. The storage unit may be a memory. The processing unit 310 may be implemented by a processor. As shown in FIG. 7, a communication apparatus 400 may include a processor 410, a memory 420, a transceiver 430, and a bus system 440. Components of the communication apparatus 400 are coupled together by using the bus system 440. In addition to a data bus, a power bus, a control bus, a status signal bus, and the like may further be included in the bus system 440. However, for the purpose of clear description, various types of buses are represented as the bus system 440 in FIG. 7. For ease of representation, only illustrative depiction is provided in FIG. 7.

The communication apparatus 300 shown in FIG. 6 or the communication apparatus 400 shown in FIG. 7 can implement the operations performed by the first terminal device in the embodiments of the foregoing method 200 and the embodiments shown in FIG. 3 to FIG. 5. For similar descriptions, refer to the descriptions in the foregoing corresponding methods. To avoid repetition, details are not described herein again.

It should be further understood that the communication apparatus 300 shown in FIG. 6 or the communication apparatus 400 shown in FIG. 7 may be a terminal device.

Figure 8:
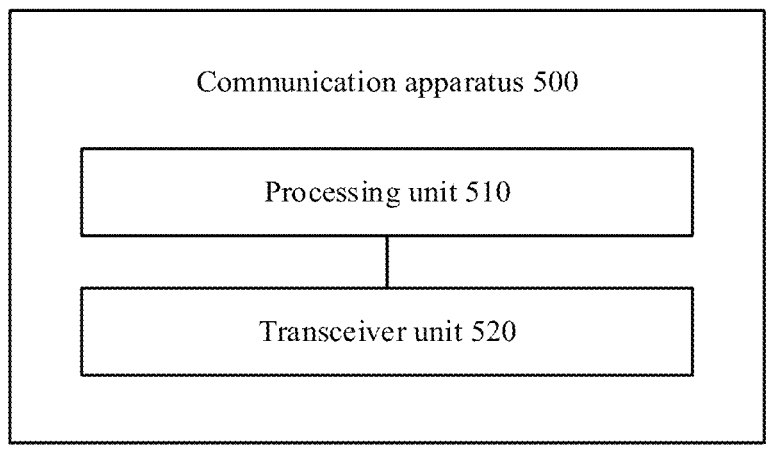
FIG. 8 is a schematic block diagram of still another communication apparatus according to an embodiment of this application.

FIG. 8 is a schematic block diagram of a communication apparatus 500 according to an embodiment of this application. The apparatus 500 may correspond to the network device described in the method 200, or may be a chip or a component used in the network device. In addition, modules or units in the apparatus 500 are separately configured to perform the actions or processing processes performed by the network device in the method 200.

As shown in FIG. 8, the apparatus 500 may include a processing unit 510 and a transceiver unit 520. The transceiver unit 520 is configured to send or receive a specific signal under driving of the processing unit 510.

The processing unit 510 is configured to determine a first sequence based on a first parameter, a second parameter, and a third parameter, where the first sequence is determined based on the third parameter and a second sequence, the second sequence is determined based on the first parameter and the second parameter, the first parameter and the second parameter are root indexes of the second sequence, and the third parameter is a time domain cyclic shift value.

The transceiver unit 520 is configured to receive a first signal.

The processing unit 510 is further configured to determine, based on the first sequence and the first signal, whether the first signal includes a signal generated based on the first sequence.

An element in the second sequence, the first parameter, and the second parameter satisfy the following relationship:

$$x_{u_1,u_2}(n) = \alpha e^{j2\pi\left(\frac{u_1 \times ((n \bmod P) - u_2)^3}{P} + \varphi\right)},$$

where $u_1$ represents the first parameter; $u_2$ represents the second parameter; $x_{u_1,u_2}(n)$ represents an $n^{th}$ element in the second sequence; $\alpha$ is a non-zero complex number; $\varphi$ is a real number; j represents a symbol of an imaginary number in a complex number; n mod P represents performing a modulo operation on n and P, where a value of n ranges from 0 to N−1, and N is a length of the first sequence; $u_1$ is a positive integer less than or equal to P−1; $u_2$ is a natural number less than or equal to P−1; and P is a prime number, where P is a minimum prime number greater than or equal to N, or P is a maximum prime number less than or equal to N, or P is a minimum prime number greater than or equal to 2×N, or P is a maximum prime number less than or equal to 2×N.

According to the communication apparatus provided in this application, one root sequence (the second sequence) is determined based on the two parameters (two root indexes), the first sequence is determined based on the root sequence and the time domain cyclic shift value, and the signal (for example, a RACH signal) is generated based on the first sequence. A quantity of different root sequences used to generate a sequence may be increased, so that a quantity of first sequences used to generate the signal is increased, thereby reducing a probability that different terminal devices use a same first sequence, and resolving a problem of a collision between sequences used by the different terminal devices. In this way, the different terminal devices are prevented, to a great extent, from generating a same signal, so that interference between signals is reduced, communication efficiency is improved, and efficiency of signal transmission for more users can be ensured.

In one embodiment, in some embodiments of this application, an element in the first sequence, the element in the second sequence, and the third parameter satisfy the following relationship:

$$x_{u_1,u_2,v}(n) = x_{u_1,u_2}(n) \times e^{j2\pi\left(\frac{c_v \times n}{N}\right)},$$

where $x_{u_1,u_2,v}(n)$ represents an $n^{th}$ element in the first sequence; $c_v$ represents the third parameter, and c, is a real number; $x_{u_1,u_2}(n)$ represents the $n^{th}$ element in the second sequence; and j represents the symbol of the imaginary number in the complex number.

In one embodiment, in some embodiments of this application, the transceiver unit 520 is further configured to separately send information about a parameter group to a first terminal device and a second terminal device, where when the first parameter and the second parameter included in the parameter group sent to the first terminal device are respectively the same as a first parameter and a second parameter included in the parameter group sent to the second terminal device, an absolute value of a difference between the third parameter included in the parameter group sent to the first terminal device and a third parameter included in the parameter group sent to the second terminal device is greater than a first threshold, where the first terminal device and the second terminal device are located in a same cell.

In one embodiment, in some embodiments of this application, the transceiver unit 520 is further configured to separately send information about a parameter group to the first terminal device and a third terminal device, where when the first parameter included in the parameter group sent to the first terminal device is the same as a first parameter included in the parameter group sent to the third terminal device, an absolute value of a difference between the second parameter included in the parameter group sent to the first terminal device and a second parameter included in the parameter group sent to the third terminal device is greater than a second threshold, where the first terminal device and the third terminal device are located in a same cell.

In one embodiment, in some embodiments of this application, the transceiver unit 520 is further configured to send information about a first parameter group set to the first terminal device, where the first parameter group set includes a first parameter group, and the first parameter group includes the first parameter, the second parameter, and the third parameter.

In one embodiment, in some embodiments of this application, in the first parameter group set, an absolute value of a difference between third parameters in any two parameter groups that have same first parameters and same second parameters is greater than the first threshold.

In one embodiment, in some embodiments of this application, in the first parameter group set, an absolute value of a difference between second parameters in any two parameter groups that have same first parameters is greater than the second threshold.

In one embodiment, in some embodiments of this application, a second parameter group set includes the first parameter group set, where the second parameter group set corresponds to the cell in which the first terminal device is located, and the second parameter group set includes M parameter groups. A candidate parameter group set includes the second parameter group set, where the candidate parameter group set includes a plurality of parameter group subsets, and an $i^{th}$ parameter group subset includes $K_i$ parameter groups, where both i and $K_i$ are positive integers, all first parameters included in one parameter group subset are the same, and first parameters in any two parameter group subsets in the candidate parameter group set are different.

When M is less than or equal to a maximum value of $K_i$, the M parameter groups are any M parameter groups included in any parameter group subset in which a quantity of parameter groups is greater than or equal to M; and/or when M is greater than the maximum value of $K_i$, the M parameter groups include a parameter group subsets and b parameter groups, where both a and b are positive integers, the a parameter group subsets are any a parameter group subsets in the candidate parameter group set, and the b parameter groups are any b parameter groups in any parameter group subset other than the a parameter group subsets in the candidate parameter group set.

In one embodiment, in some embodiments of this application, the processing unit 510 is further configured to: obtain a sequence carried on a subcarrier of the first signal; correlate the carried sequence with the first sequence; and determine whether the first signal includes the signal generated based on the first sequence.

It should be understood that for a specific process in which the units in the apparatus 500 perform the foregoing corresponding operations, refer to the foregoing descriptions related to the network device with reference to the related embodiments in the method 200 and FIG. 3 to FIG. 5. For brevity, details are not described herein again.

In one embodiment, the transceiver unit 520 may include a receiving unit (module) and a sending unit (module), configured to perform the operations of sending information and receiving information that are performed by the network device in the embodiments of the foregoing method 200 and the embodiments shown in FIG. 3 to FIG. 5.

Further, the apparatus 500 may further include a storage unit, and the transceiver unit 520 may be a transceiver, an input/output interface, or an interface circuit. The storage unit is configured to store instructions executed by the transceiver unit 520 and the processing unit 510. The transceiver unit 520, the processing unit 510, and the storage unit are coupled to each other. The storage unit stores the instructions. The processing unit 510 is configured to execute the instructions stored in the storage unit. The transceiver unit 520 is configured to send or receive the specific signal under driving of the processing unit 510.

Figure 9:
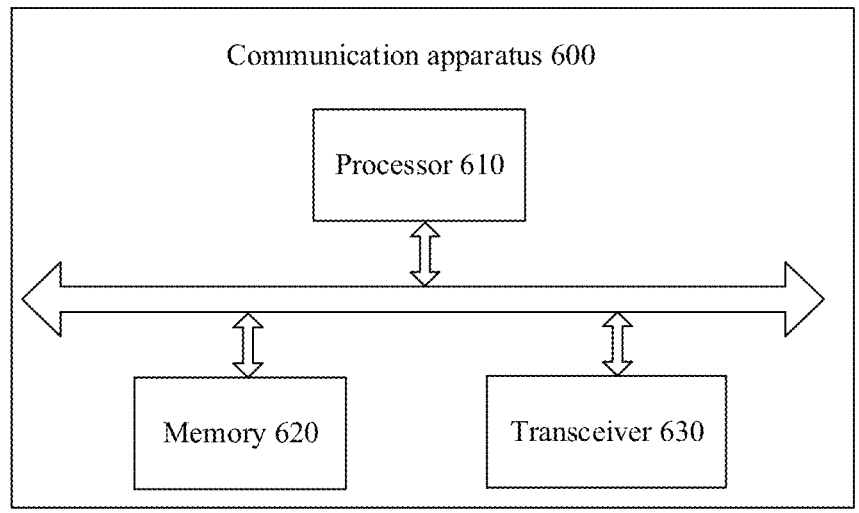
FIG. 9 is a schematic block diagram of another communication apparatus according to an embodiment of this application.

It should be understood that the transceiver unit 520 may be the transceiver, the input/output interface, or the interface circuit. The storage unit may be a memory. The processing unit 510 may be implemented by a processor. As shown in FIG. 9, a communication apparatus 600 may include a processor 610, a memory 620, and a transceiver 630.

The communication apparatus 500 shown in FIG. 8 or the communication apparatus 600 shown in FIG. 9 can implement the operations performed by the network device in the embodiments of the foregoing method 200 and the embodiments shown in FIG. 3 to FIG. 5. For similar descriptions, refer to the descriptions in the foregoing corresponding methods. To avoid repetition, details are not described herein again.

It should be further understood that the communication apparatus 500 shown in FIG. 8 or the communication apparatus 600 shown in FIG. 9 may be a network device.

It should be further understood that division into the units in the apparatus is merely logical function division. During actual implementation, all or some of the units may be integrated into one physical entity, or may be physically separated. In addition, all the units in the apparatus may be implemented in a form of software invoked by a processing element, or may be implemented by hardware; or some units may be implemented in a form of software invoked by a processing element, and some units may be implemented by hardware. For example, each unit may be an independently disposed processing element, or may be integrated into a chip of the apparatus for implementation. Alternatively, each unit may be stored in a memory in a form of a program to be invoked by a processing element of the apparatus to perform a function of the unit. The processing element herein may also be referred to as a processor, and may be an integrated circuit having a signal processing capability. In an implementation process, the operations in the foregoing methods or the foregoing units may be implemented by using a hardware integrated logic circuit of the processor element, or may be implemented in a form of software invoked by the processing element.

For example, a unit in any one of the foregoing apparatuses may be one or more integrated circuits configured to implement the foregoing method, for example, one or more application-specific integrated circuits (ASICs), one or more digital signal processors (DSPs), one or more field programmable gate arrays (FPGAs), or a combination of at least two of these types of integrated circuits. For another example, when the units in the apparatus may be implemented in a form in which a processing element schedules a program, the processing element may be a general-purpose processor, for example, a central processing unit (central processing unit, CPU) or another processor that can invoke the program. For another example, the units may be integrated for implementation in a form of a system-on-a-chip (SOC).

Figure 10:
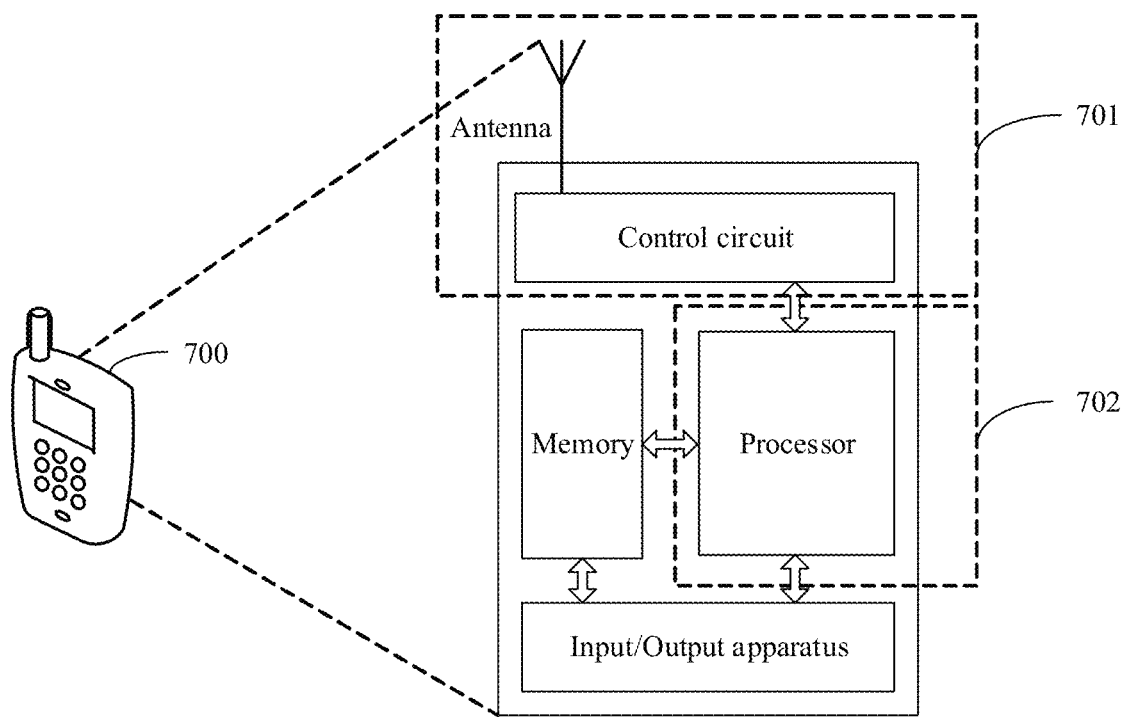
FIG. 10 is a schematic block diagram of a terminal device according to an embodiment of this application.

FIG. 10 is a schematic diagram of a structure of a terminal device 700 according to this application. The apparatus 300 or the apparatus 400 may be configured in the terminal device 700. Alternatively, the apparatus 300 or the apparatus 400 may be the terminal device 700. In other words, the terminal device 700 may perform the actions performed by the terminal device in the foregoing method 200.

For ease of description, FIG. 10 shows only main components of the terminal device. As shown in FIG. 10, the terminal device 700 includes a processor, a memory, a control circuit, an antenna, and an input/output apparatus.

The processor is mainly configured to process a communication protocol and communication data, control the entire terminal device, execute a software program, and process data of the software program, for example, configured to support the terminal device in performing the actions described in the embodiments of the transmission precoding matrix indication method. The memory is mainly configured to store the software program and the data, for example, store a codebook described in the foregoing embodiments. The control circuit is mainly configured to: perform conversion between a baseband signal and a radio frequency signal; and process the radio frequency signal. A combination of the control circuit and the antenna may also be referred to as a transceiver, and is mainly configured to receive and send a radio frequency signal in a form of an electromagnetic wave. The input/output apparatus such as a touchscreen, a display, or a keyboard is mainly configured to receive data entered by a user and output data to the user.

After the terminal device is powered on, the processor may read the software program in a storage unit, explain and execute instructions of the software program, and process the data of the software program. When the processor needs to send data in a wireless manner, the processor outputs a baseband signal to a radio frequency circuit after performing baseband processing on the to-be-sent data. After performing radio frequency processing on the baseband signal, the radio frequency circuit sends a radio frequency signal in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 10 shows only one memory and only one processor. Actually, the terminal device may include a plurality of processors and a plurality of memories. The memory may also be referred to as a storage medium, a storage device, or the like. This is not limited in this embodiment of this application.

For example, the processor may include a baseband processor and a central processing unit. The baseband processor is mainly configured to process the communication protocol and the communication data. The central processing unit is mainly configured to: control the entire terminal device, execute the software program, and process the data of the software program. The processor in FIG. 10 integrates functions of the baseband processor and the central processing unit. A person skilled in the art may understand that the baseband processor and the central processing unit may be alternatively processors independent of each other, and are connected to each other by using a technology such as a bus. A person skilled in the art may understand that the terminal device may include a plurality of baseband processors to adapt to different network standards, the terminal device may include a plurality of central processing units to enhance a processing capability of the terminal device, and all components of the terminal device may be connected to each other by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program. The processor executes the software program, to implement a baseband processing function.

For example, in this embodiment of this application, the antenna and the control circuit that have receiving and sending functions may be considered as a transceiver unit 701 of the terminal device 700, and the processor having a processing function may be considered as a processing unit 702 of the terminal device 700. As shown in FIG. 10, the terminal device 700 includes the transceiver unit 701 and the processing unit 702. The transceiver unit may also be referred to as a transceiver, a transceiver apparatus, or the like. In one embodiment, a component that is in the transceiver unit 701 and that is configured to implement a receiving function may be considered as a receiving unit, and a component that is in the transceiver unit 701 and that is configured to implement a sending function may be considered as a sending unit. In other words, the transceiver unit 701 includes the receiving unit and the sending unit. For example, the receiving unit may also be referred to as a receiver, a receiving circuit, or the like, and the sending unit may also be referred to as a transmitter, a transmit circuit, or the like.

Figure 11:
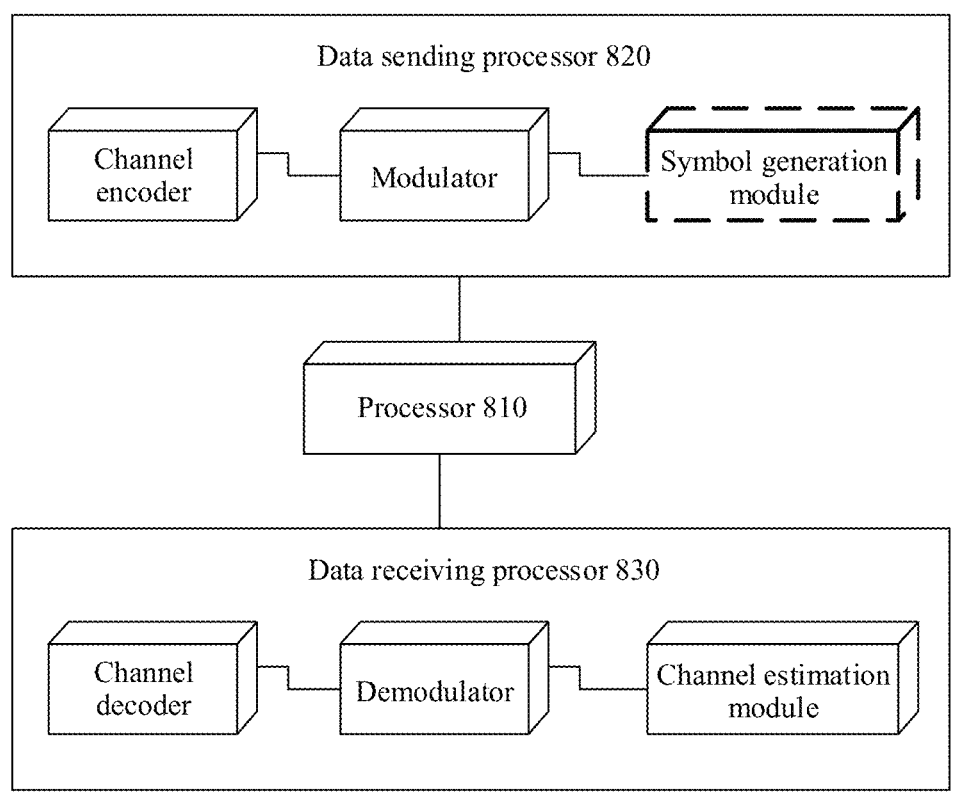
FIG. 11 is a schematic block diagram of another terminal device according to an embodiment of this application.

FIG. 11 is a schematic diagram of a structure of another terminal device 800 according to this application. In FIG. 11, the terminal device includes a processor 810, a data sending processor 820, and a data receiving processor 830. The processing unit 310 in the foregoing embodiment may be the processor 810 in FIG. 11, and implements a corresponding function. The transceiver unit 320 in the foregoing embodiment may be the data sending processor 820 and/or the data receiving processor 830 in FIG. 11. Although FIG. 11 shows a channel encoder and a channel decoder, it may be understood that the modules are merely examples, and do not constitute a limitation on this embodiment.

Figure 12:
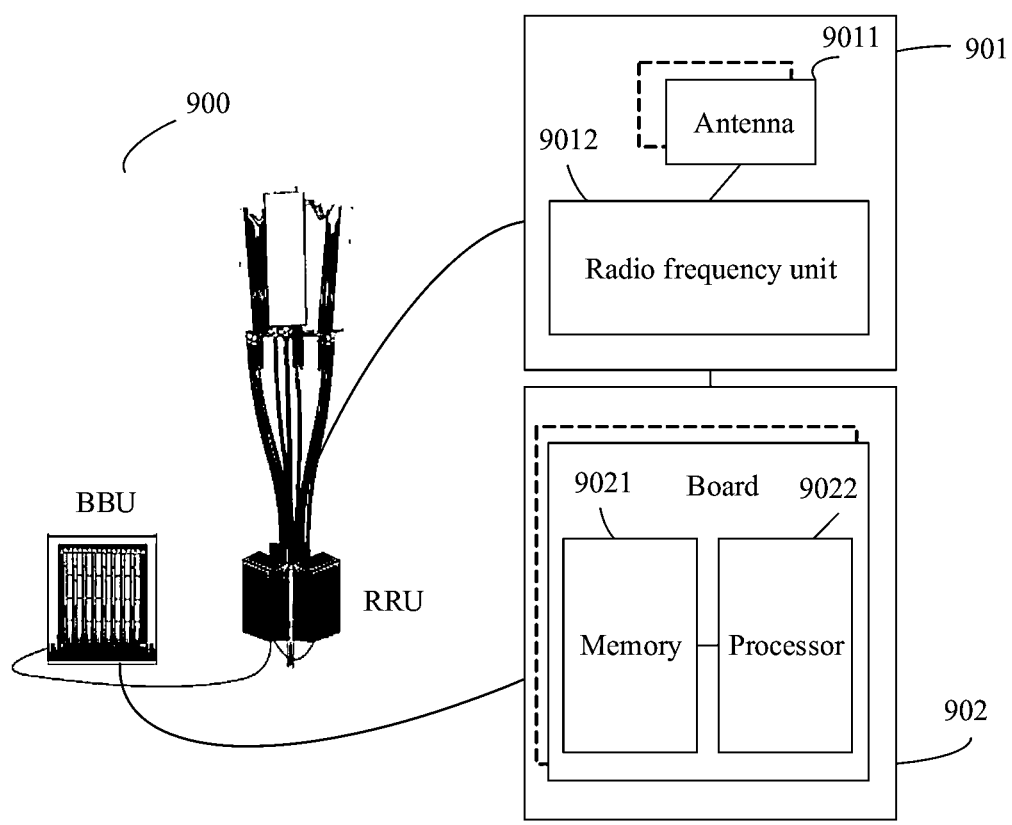
FIG. 12 is a schematic block diagram of a network device according to an embodiment of this application.

FIG. 12 is a schematic diagram of a structure of a network device 900 according to an embodiment of this application. The network device 900 may be configured to implement functions of the network device in the foregoing method. The network device 900 includes one or more radio frequency units such as a remote radio unit (RRU) 901 and one or more baseband units (BBUs) (which may also be referred to as a digital unit, (DU)) 902. The RRU 901 may be referred to as a transceiver unit, a transceiver, a transceiver circuit, or the like, and may include at least one antenna 9011 and a radio frequency unit 9012. The RRU 901 is mainly configured to perform receiving and sending of a radio frequency signal and conversion between a radio frequency signal and a baseband signal, for example, send the signaling message in the foregoing embodiment to a terminal device. The BBU 902 is mainly configured to perform baseband processing, control the base station, and so on. The RRU 901 and the BBU 902 may be physically disposed together, or may be physically separated, that is, in a distributed base station.

The BBU 902 is a control center of the base station, may also be referred to as a processing unit, and is mainly configured to perform baseband processing functions such as channel coding, multiplexing, modulation, or spreading. For example, the BBU (the processing unit) 902 may be configured to control a base station 90 to perform the operation procedure related to the network device in the foregoing method embodiments.

In an example, the BBU 902 may include one or more boards. A plurality of boards may jointly support a radio access network (for example, an LTE system or a 5G system) of a single access standard, or may respectively support radio access networks of different access standards. The BBU 902 further includes a memory 9021 and a processor 9022. The memory 9021 is configured to store necessary instructions and necessary data. For example, the memory 9021 stores the codebook and the like in the foregoing embodiments. The processor 9022 is configured to control the base station to perform a necessary action, for example, configured to control the base station to perform the operation procedure related to the network device in the foregoing method embodiments. The memory 9021 and the processor 9022 may serve one or more boards. In other words, a memory and a processor may be separately disposed on each board. Alternatively, a plurality of boards may share a same memory and a same processor. In addition, a necessary circuit may further be disposed on each board.

In a possible implementation, with development of a system-on-a-chip (SoC) technology, all or some functions of 902 and 901 may be implemented by using the SoC technology, for example, implemented by using a base station function chip. The base station function chip integrates components such as a processor, a memory, and an antenna interface. A program of a base station-related function is stored in the memory. The processor executes the program to implement the base station-related function. In one embodiment, the base station function chip can also read from an external memory of the chip, to implement a function related to the base station.

It should be understood that the structure of the network device shown in FIG. 12 is merely a possible form, but should not constitute any limitation on embodiments of this application. In this application, a possibility that there may be a base station structure in another form in the future is not excluded.

It should be understood that, in embodiments of this application, the processor may be a central processing unit (CPU), or the processor may be another general-purpose processor, a digital signal processor (DSP), an application-specific integrated circuit (ASIC), a field programmable gate array (FPGA), another programmable logic device, a discrete gate or transistor logic device, a discrete hardware component, or the like. The general-purpose processor may be a microprocessor, or the processor may be any conventional processor or the like.

It should be further understood that, the memory in embodiments of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external high-speed cache. By way of example but not limitation, many forms of random access memories (RAMs) are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

The foregoing embodiments may be all or partly implemented by software, hardware, firmware, or any combination thereof. When the software is used to implement the embodiments, all or some of the foregoing embodiments may be implemented in a form of a computer program product. The computer program product includes one or more computer instructions or computer programs. When the computer instructions or the computer programs are loaded and executed on a computer, the procedure or function according to embodiments of this application is all or partially generated. The computer may be a general-purpose computer, a special-purpose computer, a computer network, or another programmable apparatus.

The computer instructions may be stored in a computer-readable storage medium, or transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible to a computer or a data storage device, such as a server or a data center, including one or more usable media. The usable medium may be a magnetic medium (such as a floppy disk, a hard disk, or a magnetic tape), an optical medium (such as a DVD), or a semiconductor medium. The semiconductor medium may be a solid-state drive.

An embodiment of this application further provides a communication system. The communication system includes the foregoing first terminal device and the network device. In one embodiment, the communication system further includes the foregoing second terminal device and/or third terminal device.

An embodiment of this application further provides a computer-readable medium, configured to store computer program code. The computer program includes instructions used to perform the sequence-based signal transmission method in embodiments of this application in the method 200. The readable medium may be a read-only memory (ROM) or a random access memory (RAM). This is not limited in this embodiment of this application.

This application further provides a computer program product. The computer program product includes instructions. When the instructions are executed, a terminal device and a network device are enabled to perform operations corresponding to the terminal device and the network device in the foregoing methods.

An embodiment of this application further provides a system chip. The system chip includes a processing unit and a communication unit. The processing unit may be, for example, a processor. The communication unit may be, for example, an input/output interface, a pin, or a circuit. The processing unit may execute computer instructions, so that a chip in a communication apparatus performs any sequence-based signal transmission method provided in the foregoing embodiments of this application.

In one embodiment, any communication apparatus provided in embodiments of this application may include the system chip.

In one embodiment, the computer instructions are stored in a storage unit.

In one embodiment, the storage unit is a storage unit in the chip, for example, a register or a cache. Alternatively, the storage unit may be a storage unit that is in a terminal and that is located outside the chip, for example, a ROM, another type of static storage device that can store static information and instructions, or a RAM. Any aforementioned processor may be a CPU, a microprocessor, an ASIC, or one or more integrated circuits configured to control execution of a program for the foregoing sequence-based signal transmission method. The processing unit and the storage unit may be decoupled, respectively disposed on different physical devices, and connected in a wired or wireless manner to implement respective functions of the processing unit and the storage unit, to support the system chip in implementing various functions in the foregoing embodiments. Alternatively, the processing unit and the memory may be coupled on one device.

It may be understood that the memory in embodiments of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external high-speed cache. By way of example but not limitation, many forms of random access memories (RAMs) are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

The terms "system" and "network" are often used interchangeably in this specification. The term "and/or" in this specification describes only an association relationship between associated objects and represents that three relationships may exist. For example, A and/or B may represent the following three cases: Only A exists, both A and B exist, and only B exists. In addition, the character "/" in this specification usually indicates an "or" relationship between the associated objects.

The term "uplink" or "downlink" in this application is used to describe a data/information transmission direction in a specific scenario. For example, an "uplink" direction is usually a direction in which data/information is transmitted from a terminal to a network side, or a direction in which data/information is transmitted from a distributed unit to a centralized unit; and a "downlink" direction is usually a direction in which data/information is transmitted from a network side to a terminal, or a direction in which data/information is transmitted from a centralized unit to a distributed unit. It can be understood that "uplink" or "downlink" is merely used to describe a data/information transmission direction, without limiting a specific starting or ending device of data/information transmission.

Names are given to various types of objects such as various messages/information/devices/network elements/systems/apparatuses/actions/operations/procedures/concepts that may appear in this application. It may be understood that these specific names do not constitute a limitation on the related objects. The given names may change with factors such as scenarios, contexts, or use habits. The understanding of the technical meanings of the technical terms in this application should be determined mainly based on the functions and technical effects embodied/performed by the technical terms in the technical solutions.

A person of ordinary skill in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical function division, and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in embodiments of this application. The storage medium includes a USB flash drive, a removable hard disk, a read-only memory (ROM), or random access.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for transmitting a signal, comprising:
    determining, by a first terminal device, a first sequence based on a first parameter, a second parameter, and a third parameter, wherein the first sequence is determined based on the third parameter and a second sequence, wherein the second sequence is determined based on the first parameter and the second parameter, wherein the first parameter and the second parameter are root indexes of the second sequence, and wherein the third parameter is a time domain cyclic shift value; and
    sending, by the first terminal device, the signal based on the first sequence, wherein
    an element in the second sequence, the first parameter, and the second parameter satisfy:

$$x_{u_1,u_2}(n) = \alpha e^{j2\pi\left(\frac{u_1 \times ((n \bmod P) - u_2)^3}{P} + \varphi\right)},$$

wherein
    $u_1$ represents the first parameter; $u_2$ represents the second parameter; $x_{u_1,u_2}(n)$ represents an $n^{th}$ element in the second sequence; $\alpha$ is a non-zero complex number; $\varphi$ is a real number; j represents a symbol of an imaginary number in a complex number; n mod P represents performing a modulo operation on n and P, wherein a value of n ranges from 0 to N−1, and N is a length of the first sequence; $u_1$ is a positive integer less than or equal to P−1; $u_2$ is a natural number less than or equal to P−1; and wherein P is a prime number, wherein P is a minimum prime number greater than or equal to N, or P is a maximum prime number less than or equal to N, or P is a minimum prime number greater than or equal to 2×N, or P is a maximum prime number less than or equal to 2×N.

2. The method according to claim 1, wherein
an element in the first sequence, the element in the second sequence, and the third parameter satisfy:

$$x_{u_1,u_2,v}(n) = x_{u_1,u_2}(n) \times e^{j2\pi\left(\frac{c_v \times n}{N}\right)},$$

wherein
    $x_{u_1,u_2,v}(n)$ represents an $n^{th}$ element in the first sequence; $c_v$ is a real number, and represents the third parameter; $x_{u_1,u_2}(n)$ represents the $n^{th}$ element in the second sequence; and j represents the symbol of the imaginary number in the complex number.

3. The method according to claim 1, wherein
when the first parameter and the second parameter are respectively the same as a first parameter and a second parameter that are used by a second terminal device, an absolute value of a difference between the third parameter and a third parameter used by the second terminal device is greater than a first threshold, and wherein the first terminal device and the second terminal device are located in a same cell.

4. The method according to claim 1, wherein when the first parameter is the same as a first parameter used by a third terminal device, an absolute value of a difference between the second parameter used by the first terminal device and a second parameter used by the third terminal device is greater than a second threshold, and wherein the first terminal device and the third terminal device are located in a same cell.

5. The method according to claim 1, comprising:
receiving, by the first terminal device, information about a first parameter group set comprising a plurality of parameter groups; and
determining, by the first terminal device, a first parameter group in the first parameter group set, wherein the first parameter group comprises the first parameter, the second parameter, and the third parameter.

6. The method according to claim 5, wherein,
in the first parameter group set, an absolute value of a difference between third parameters in any two parameter groups that have same first parameters and same second parameters is greater than a first threshold.

7. The method according to claim 5, wherein,
in the first parameter group set, an absolute value of a difference between second parameters in any two parameter groups that have same first parameters is greater than a second threshold.

8. The method according to claim 5, wherein
a second parameter group set comprises the first parameter group set, wherein the second parameter group set corresponds to a cell in which the first terminal device is located, and wherein the second parameter group set comprises M parameter groups; and wherein a candidate parameter group set comprises the second parameter group set, wherein the candidate parameter group set comprises a plurality of parameter group subsets, and wherein an $i^{th}$ parameter group subset comprises $K_i$ parameter groups, wherein both i and $K_i$ are positive integers, all first parameters comprised in one parameter group subset are the same, and wherein first parameters in any two parameter group subsets in the candidate parameter group set are different, wherein
when M is less than or equal to a maximum value of $K_i$, the M parameter groups are any M parameter groups comprised in any parameter group subset in which a quantity of parameter groups is greater than or equal to M; and/or
when M is greater than the maximum value of $K_i$, the M parameter groups comprise a parameter group subsets and b parameter groups, wherein both a and b are positive integers, wherein the a parameter group subsets are any a parameter group subsets in the candidate parameter group set, and wherein the b parameter groups are any b parameter groups in any parameter group subset other than the a parameter group subsets in the candidate parameter group set.

9. A method for receiving a signal, comprising:
determining, by a network device, a first sequence based on a first parameter, a second parameter, and a third parameter, wherein the first sequence is determined based on the third parameter and a second sequence, the second sequence is determined based on the first parameter and the second parameter, the first parameter and the second parameter are root indexes of the second sequence, and the third parameter is a time domain cyclic shift value;
receiving, by the network device, a first signal; and
determining, by the network device based on the first sequence and the first signal, whether the first signal comprises a signal generated based on the first sequence, wherein
an element in the second sequence, the first parameter, and the second parameter satisfy:

$$x_{u_1,u_2}(n) = \alpha e^{j2\pi\left(\frac{u_1 \times ((n \bmod P) - u_2)^3}{P} + \varphi\right)},$$

wherein
$u_1$ represents the first parameter; $u_2$ represents the second parameter; $x_{u_1,u_2}(n)$ represents an $n^{th}$ element in the second sequence; $\alpha$ is a non-zero complex number; $\varphi$ is a real number; j represents a symbol of an imaginary number in a complex number; n mod P represents performing a modulo operation on n and P, wherein a value of n ranges from 0 to N−1, and N is a length of the first sequence; $u_1$ is a positive integer less than or equal to P−1; $u_2$ is a natural number less than or equal to P−1; and P is a prime number, wherein P is a minimum prime number greater than or equal to N, or P is a maximum prime number less than or equal to N, or P is a minimum prime number greater than or equal to 2×N, or P is a maximum prime number less than or equal to 2×N.

10. The method according to claim 9, wherein
an element in the first sequence, the element in the second sequence, and the third parameter satisfy:

$$x_{u_1,u_2,v}(n) = x_{u_1,u_2}(n) \times e^{j2\pi\left(\frac{c_v \times n}{N}\right)},$$

$x_{u_1,u_2,v}(n)$ represents an $n^{th}$ element in the first sequence; $c_v$ represents the third parameter, and $c_v$ is a real number; $x_{u_1,u_2}(n)$ represents the $n^{th}$ element in the second sequence; and j represents the symbol of the imaginary number in the complex number.

11. The method according to claim 9, wherein the method further comprises:
separately sending, by the network device, information about a parameter group to a first terminal device and a second terminal device, wherein when the first parameter and the second parameter comprised in the parameter group sent to the first terminal device are respectively the same as a first parameter and a second parameter comprised in the parameter group sent to the second terminal device, an absolute value of a difference between the third parameter comprised in the parameter group sent to the first terminal device and a third parameter comprised in the parameter group sent to the second terminal device is greater than a first threshold, and wherein the first terminal device and the second terminal device are located in a same cell.

12. The method according to claim 9, wherein the method further comprises:
separately sending, by the network device, information about a parameter group to a first terminal device and a third terminal device, wherein when the first parameter comprised in the parameter group sent to the first terminal device is the same as a first parameter comprised in the parameter group sent to the third terminal device, an absolute value of a difference between the second parameter comprised in the parameter group sent to the first terminal device and a second parameter comprised in the parameter group sent to the third terminal device is greater than a second threshold, and wherein the first terminal device and the third terminal device are located in a same cell.

13. The method according to claim 9, wherein the method further comprises:
sending, by the network device, information about a first parameter group set to a first terminal device, wherein the first parameter group set comprises a first parameter group comprising the first parameter, the second parameter, and the third parameter.

14. The method according to claim 13, wherein,
in the first parameter group set, an absolute value of a difference between third parameters in any two parameter groups that have same first parameters and same second parameters is greater than a first threshold.

15. The method according to claim 13, wherein
a second parameter group set comprises the first parameter group set, wherein the second parameter group set corresponds to a cell in which the first terminal device is located, and wherein the second parameter group set comprises M parameter groups; and wherein a candidate parameter group set comprises the second parameter group set, wherein the candidate parameter group set comprises a plurality of parameter group subsets, and wherein an $i^{th}$ parameter group subset comprises $K_i$ parameter groups, wherein both i and $K_i$ are positive integers, wherein all first parameters comprised in one parameter group subset are the same, and wherein first parameters in any two parameter group subsets in the candidate parameter group set are different, wherein
when M is less than or equal to a maximum value of $K_i$, the M parameter groups are any M parameter groups comprised in any parameter group subset in which a quantity of parameter groups is greater than or equal to M; and/or
when M is greater than the maximum value of $K_i$, the M parameter groups comprise a parameter group subsets and b parameter groups, wherein both a and b are positive integers, wherein the a parameter group subsets are any a parameter group subsets in the candidate parameter group set, and wherein the b parameter groups are any b parameter groups in any parameter group subset other than the a parameter group subsets in the candidate parameter group set.

16. An apparatus, comprising:
at least one processor; and
one or more memories coupled to the at least one processor and storing programming instructions for execution by the at least one processor, cause the apparatus to:
determine a first sequence based on a first parameter, a second parameter, and a third parameter, wherein the first sequence is determined based on the third parameter and a second sequence, the second sequence is determined based on the first parameter and the second parameter, the first parameter and the second parameter are root indexes of the second sequence, and the third parameter is a time domain cyclic shift value; and
send a signal based on the first sequence, wherein an element in the second sequence, the first parameter, and the second parameter satisfy:

$$x_{u_1,u_2}(n) = \alpha e^{j2\pi\left(\frac{u_1 \times ((n \bmod P) - u_2)^3}{P} + \varphi\right)},$$

wherein
$u_1$ represents the first parameter; $u_2$ represents the second parameter; $x_{u_1,u_2}(n)$ represents an $n^{th}$ element in the second sequence; $\alpha$ is a non-zero complex number; $\varphi$ is a real number; j represents a symbol of an imaginary number in a complex number; n mod P represents performing a modulo operation on n and P, wherein a value of n ranges from 0 to N−1, and N is a length of the first sequence; $u_1$ is a positive integer less than or equal to P−1; $u_2$ is a natural number less than or equal to P−1; and P is a prime number, wherein P is a minimum prime number greater than or equal to N, or P is a maximum prime number less than or equal to N, or P is a minimum prime number greater than or equal to 2×N, or P is a maximum prime number less than or equal to 2×N.

17. The apparatus according to claim 16, wherein
an element in the first sequence, the element in the second sequence, and the third parameter satisfy:

$$x_{u_1,u_2,v}(n) = x_{u_1,u_2}(n) \times e^{j2\pi\left(\frac{c_v \times n}{N}\right)},$$

wherein
$x_{u_1,u_2,v}(n)$ represents an $n^{th}$ element in the first sequence; $c_v$ is a real number, and represents the third parameter; $x_{u_1,u_2}(n)$ represents the $n^{th}$ element in the second sequence; and j represents the symbol of the imaginary number in the complex number.

18. The apparatus according to claim 16, wherein
when the first parameter and the second parameter are respectively the same as a first parameter and a second parameter that are used by a second terminal device, an absolute value of a difference between the third parameter and a third parameter used by the second terminal device is greater than a first threshold, wherein the apparatus and the second terminal device are located in a same cell.

19. The apparatus according to claim 16, wherein
when the first parameter is the same as a first parameter used by a third terminal device, an absolute value of a difference between the second parameter used by the apparatus and a second parameter used by the third terminal device is greater than a second threshold, wherein the apparatus and the third terminal device are located in a same cell.

20. The apparatus according to claim 16, wherein the programming instructions, when executed by the at least one processor, further cause the apparatus to:
receive information about a first parameter group set, wherein the first parameter group set comprises a plurality of parameter groups; and
determine a first parameter group in the first parameter group set, wherein the first parameter group comprises the first parameter, the second parameter, and the third parameter.

* * * * *